United States Patent
Katou et al.

(10) Patent No.: US 10,253,481 B2
(45) Date of Patent: Apr. 9, 2019

(54) MAP GENERATION DEVICE

(71) Applicant: HITACHI CONSTRUCTION MACHINERY CO., LTD., Tokyo (JP)

(72) Inventors: Manabu Katou, Tokyo (JP); Hiroto Morizane, Tokyo (JP); Yukihiro Kawamata, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 64 days.

(21) Appl. No.: 15/509,212

(22) PCT Filed: Oct. 28, 2015

(86) PCT No.: PCT/JP2015/080410
§ 371 (c)(1),
(2) Date: Mar. 7, 2017

(87) PCT Pub. No.: WO2016/072329
PCT Pub. Date: May 12, 2016

(65) Prior Publication Data
US 2017/0285655 A1    Oct. 5, 2017

(30) Foreign Application Priority Data
Nov. 6, 2014  (JP) ................................. 2014-226471

(51) Int. Cl.
*E02F 9/26*       (2006.01)
*G05D 1/02*       (2006.01)
(Continued)

(52) U.S. Cl.
CPC ............ *E02F 9/261* (2013.01); *E02F 9/2045* (2013.01); *E02F 9/2054* (2013.01); *G01C 21/32* (2013.01);
(Continued)

(58) Field of Classification Search
CPC .. G05D 1/0214; G05D 1/0221; G05D 1/0274; G05D 2201/0202;
(Continued)

(56) References Cited

U.S. PATENT DOCUMENTS 5,404,661 A * 4/1995 Sahm ...................... E02F 3/427
                                                              37/347
5,631,658 A * 5/1997 Gudat .................. A01B 79/005
                                                              342/357.31
(Continued)

FOREIGN PATENT DOCUMENTS

JP      2001-344017 A    12/2001
JP      2010-134961 A     6/2010
(Continued)

OTHER PUBLICATIONS

JPO machine translation of JP 2010-134961 (original JP document published Jun. 17, 2010) (Year: 2010).*
(Continued)

*Primary Examiner* — Behrang Badii
*Assistant Examiner* — David A Testardi
(74) *Attorney, Agent, or Firm* — Mattingly & Malur, PC

(57) ABSTRACT

The present invention includes: a map information storage unit 18 storing map data 18A representing a travelable area for a dump truck 7; a work machine information accumulation unit 19 accumulating position data 6A and operational data 6B of a hydraulic excavator 6; an operational range arithmetic processing unit 21 calculating an operational range of the hydraulic excavator 7 on the basis of the position data 6A and the operational data 6B accumulated in the work machine information accumulation unit 19; and a map information update unit 22 verifying the operational range of the hydraulic excavator 6 calculated by the operational range arithmetic processing unit 21 against the map
(Continued)

data 18A stored in the map information storage unit 18 in order to correct the boundary 18a of the loading site 1 in the map data 18A and then update the map data 18A.

7 Claims, 18 Drawing Sheets

(51) Int. Cl.
    *G09B 29/00*      (2006.01)
    *E02F 9/20*       (2006.01)
    *G01C 21/32*      (2006.01)
(52) U.S. Cl.
    CPC ........... *G05D 1/0274* (2013.01); *G09B 29/00* (2013.01); *G09B 29/003* (2013.01); *G09B 29/007* (2013.01); *G05D 2201/021* (2013.01)
(58) Field of Classification Search
    CPC .. G05D 2201/021; E02F 9/2045; E02F 9/205; E02F 9/261; E02F 9/262; E02F 9/2054; G09B 29/007
    See application file for complete search history.

(56) References Cited

U.S. PATENT DOCUMENTS

| | | | | |
|---|---|---|---|---|
| 5,850,341 | A * | 12/1998 | Fournier | E02F 9/2045 |
| | | | | 701/50 |
| 6,026,341 | A * | 2/2000 | Harrod | B60P 1/162 |
| | | | | 701/50 |
| 6,539,294 | B1 * | 3/2003 | Kageyama | E02F 3/842 |
| | | | | 180/168 |
| 2002/0143461 | A1 * | 10/2002 | Burns | G05D 1/0297 |
| | | | | 701/117 |
| 2006/0104404 | A1 * | 5/2006 | Blackburn | G07C 5/085 |
| | | | | 377/27 |
| 2008/0133128 | A1 * | 6/2008 | Koch | E02F 3/435 |
| | | | | 37/348 |
| 2009/0202109 | A1 * | 8/2009 | Clar | G01C 15/00 |
| | | | | 382/104 |
| 2010/0084908 | A1 * | 4/2010 | Montocchio | B60P 1/162 |
| | | | | 298/22 C |
| 2011/0153117 | A1 * | 6/2011 | Koch | E02F 9/2054 |
| | | | | 701/2 |
| 2012/0136524 | A1 * | 5/2012 | Everett | E02F 9/2045 |
| | | | | 701/24 |
| 2012/0136525 | A1 * | 5/2012 | Everett | E02F 9/2045 |
| | | | | 701/24 |
| 2013/0238182 | A1 * | 9/2013 | Osagawa | G05D 1/0274 |
| | | | | 701/26 |
| 2014/0032132 | A1 * | 1/2014 | Stratton | G01B 21/20 |
| | | | | 702/33 |
| 2014/0107882 | A1 * | 4/2014 | Tojima | E02F 9/2045 |
| | | | | 701/23 |
| 2014/0163885 | A1 * | 6/2014 | Clar | G01C 15/00 |
| | | | | 702/5 |
| 2014/0214237 | A1 * | 7/2014 | Kini | G05D 1/0297 |
| | | | | 701/2 |
| 2015/0198736 | A1 * | 7/2015 | Clar | G01C 21/20 |
| | | | | 702/5 |
| 2015/0361642 | A1 * | 12/2015 | Stratton | G05D 1/0274 |
| | | | | 701/461 |

FOREIGN PATENT DOCUMENTS

| | | | |
|---|---|---|---|
| JP | 2010134961 A | * | 6/2010 |
| JP | 2012-118694 A | | 6/2012 |
| JP | 2013-508586 A | | 3/2013 |

OTHER PUBLICATIONS

International Search Report of PCT/JP2015/080410 dated Jan. 12, 2016.

* cited by examiner

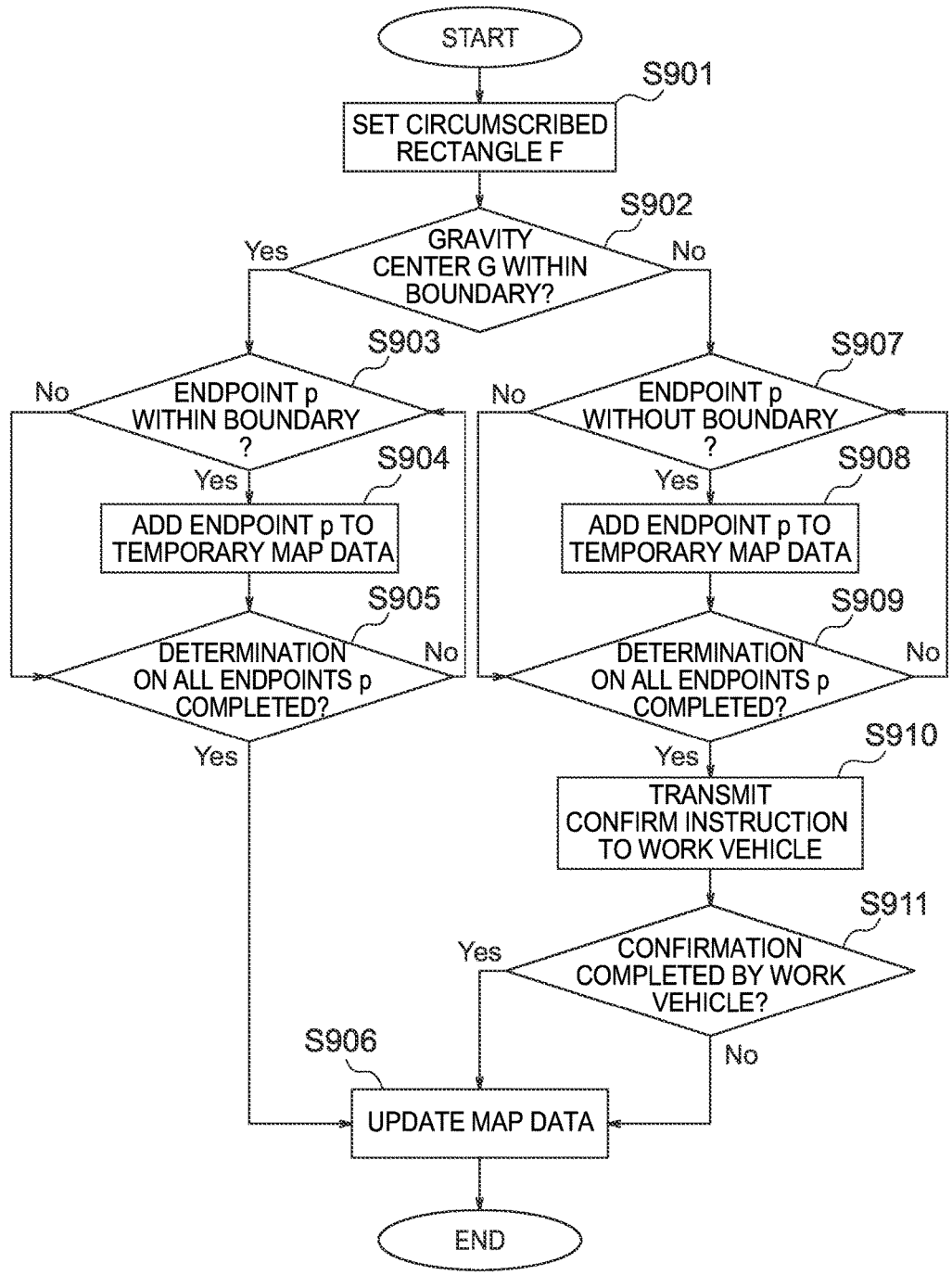

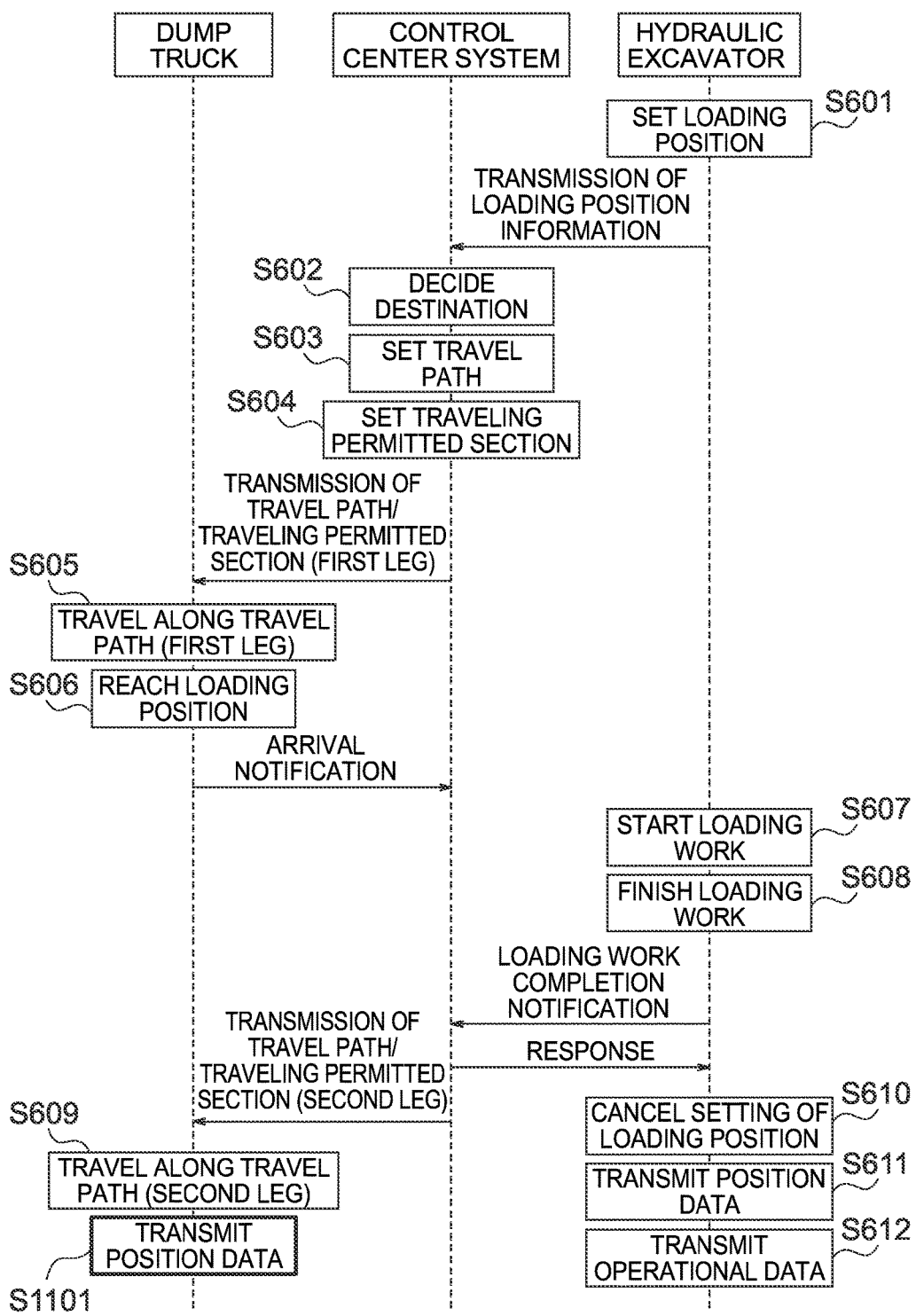

FIG.15

| ACQUISITION TIME | WORK MACHINE ID | OPERATIONAL STATUS |
|---|---|---|
| 2011-01-01 10:00 | DUMP TRUCK1 | ARRIVAL AT DUMPING POSITION |
| 2011-01-01 10:05 | DUMP TRUCK1 | BODY UP |
| 2011-01-01 10:10 | DUMP TRUCK1 | BODY DOWN |
| 2011-01-01 10:15 | DUMP TRUCK1 | END OF DUMPING AT PADDOCK 1 |
| 2011-01-01 10:30 | DUMP TRUCK1 | END OF DUMPING FROM BOUNDARY |
| ... | ... | ... |

MAP GENERATION DEVICE

TECHNICAL FIELD

The present invention relates to a map generation device generating travelable map information used for traveling of work machines.

BACKGROUND ART

For the mining operation of mines and the like, there is a need for the autonomous travel technology to use unmanned machines to carry out mining work with the aim of improving the safety and reducing the costs. At a mining site, after a work machine such as a hydraulic excavator or the like excavates minerals and/or a topsoil layer, the excavated minerals and/or topsoil layer must be hauled to the outside of the mining site. Such haulage work is carried out by a work machine such as a dump truck and the like, which has a body (vessel) capable of carrying minerals and/or topsoil layer and having a relatively high maximum load capacity.

As one of conventional techniques in the autonomous travel technology using a work machine of this type such as a dump truck, for example, an autonomous travel system is proposed to implement travel control of a vehicle for autonomous traveling without an onboard operator on the basis of own-vehicle position information calculated by a positioning device, such as using GPS (Global Positioning System) or the like, mounted on the work machine.

In the autonomous travel system, the own-vehicle position calculated by the positioning device is transmitted to a control center over wireless communications. The control center generates a transportation course from a loading site at which a work machine such as a hydraulic excavator or the like loads minerals and/or topsoil layer, to a dumping site at which a work machine such as a dump truck or the like dumps the minerals and/or topsoil layer, and generates a target route in a working site such as a loading site, dumping site and/or the like. Then, the control center transmits target route information as data indicating the target route to the work machine such as a dump truck or the like.

For the transportation course, the target route of the work machine is generated based on mine map data generated from trajectory information of the work machine, such as a dump truck or the like, previously obtained by the positioning device. Also, for the working site, a target route is generated, for example, from an entrance to a loading point to the loading point set near the work machine such as a hydraulic excavator or the like.

In contrast, the map data includes boundary information indicating a boundary. The boundary is generated by being extracted from a travel trajectory of the work machine, such as a dump truck or the like, the travel trajectory being included in the own-vehicle position information calculated by the positioning device, and the boundary defines a travelable area capable of being travelled by a work machine and a non-travelable area incapable of being travelled by a work machine. The boundary information is used to prevent interference between a boundary line in map data and a target route when the target route for the transportation course and the working site as described above are generated. Thus, the map data is required to be updated frequently as the work process proceeds.

To address this, the following patent literature 1 is known as one of conventional techniques to update map data. The patent literature 1 discloses "an unmanned-vehicle guidance device that guides an unmanned vehicle to travel along a guide course on the basis of a travel position of the unmanned vehicle measured by travel position measuring means and course data defining the guide course for the unmanned vehicle, the unmanned-vehicle guidance device comprising: means that inputs data on boundary lines of a course area; means that generates course data; means that infers interference between the unmanned vehicle and the boundary lines of the course area when the unmanned vehicle is traveled along the guide course defined by the generated course data; course data changing means that changes the course data if the interference is inferred; recognizing means that recognizes which of all segments of the boundary lines of the course area changes in shape of the boundary line; and course-area boundary-line updating means that updates data on the boundary lines of the course area in respect of only the segment with the changed shape of the boundary line of all the segments of the boundary lines of the course area, in which the recognizing means includes a work machine moving the course area, moving position measuring means that measures a moving position of the work machine, and means that specifies the segment with the changed shape of the boundary lines of all the segments of the boundary lines of the course area on the basis of the moving position of the work machine."

CITATION LIST

Patent Literature

Patent literature 1: JP-A No. 2010-134961

SUMMARY OF INVENTION

Technical Problem

The unmanned-vehicle guidance device disclosed in the above patent literature 1 uses the position information of the work machine to specify the segment with the changed shape of the boundary in the travelable map information indicating the area capable of being travelled by a work machine. However, an actual boundary of a working site such as a loading site, a dumping site and/or the like is varied with not only the moving position of the work machine but also the operational status of the work machine, but the unmanned-vehicle guidance device of the conventional techniques take only the moving position of the work machine into account. Thus, the travelable map information updated by the unmanned-vehicle guidance device of the conventional techniques may possibly not reflect properly a boundary of a working site.

For example, it is possible that a dump truck may be loaded with or may dump minerals and/or topsoil layer within the boundary of a working site in the travelable map information, whereas a loading machine may collect minerals and/or topsoil layer from a place other than the travelable area for the dump truck located across the boundary of the working site. Therefore, if the full position information of the loading machine obtained from a positioning device such as using GPS or the like is used to generate a boundary of a working site for the travelable map information as done in the unmanned-vehicle guidance device of the conventional techniques, position information about an area capable of being travelled by the dump truck may be included in the travelable map information as a travelable area. This causes a concern about a reduction in accuracy of the extraction of a boundary of a working site for the travelable map information.

Further, even if the positioning device such as using GPS or the like acquires position information while a dump truck is traveling, it is possible that the dump truck does not travel around the boundary. Therefore, if the position information while the dump truck is traveling is taken into account, this unnecessary position information may have effect on generation of boundaries of a working site for the travelable map information. In consequence of this, similarly to above, there is a concern about a reduction in accuracy of the extraction of boundaries of a working site for the travelable map information.

The present invention has been made in light of such circumstances in the conventional techniques, and it is an object of the present invention to provide a map generation device capable of improving the accuracy of extraction of a boundary of a working site in travelable map information.

Solution to Problem

To attain this object, a map generation device according to the present invention is applied to a system that controls operation of work machines including a haulage vehicle hauling a load and a loading machine loading the load on to the haulage vehicle, and generates travelable map information representing an area capable of being traveled by the haulage vehicle. The map generation device includes: a map information storage unit storing the travelable map information; a work machine information accumulation unit accumulating position information representing a position of the work machine and operational information representing an operational status of the work machine; an operational range arithmetic unit calculating an operational range of the work machine on the basis of the position information and the operational information accumulated in the work machine information accumulation unit; and a map information update unit verifying the operational range of the work machine calculated by the operational range arithmetic unit against the travelable map information stored in the map information storage unit in order to correct a boundary of a working site in the travelable map information and then update the travelable map information.

Advantageous Effects of Invention

With the map generation device according to the present invention, an improvement in accuracy of extraction of a boundary of a working site for the travelable map information is enabled. The above-recited and other problems, configuration and advantages will be apparent from the following description of embodiments.

BRIEF DESCRIPTION OF DRAWINGS

FIG. 4A and FIG. 4B are tables for illustrating an example configuration of each set of data accumulated in a work machine information accumulation unit in accordance with the first embodiment of the present invention, in which FIG. 4A is a table showing position data of the hydraulic excavator and FIG. 4B is a table showing operational data of the hydraulic excavator.

FIG. 9 is a flowchart showing a flow of update processing performed on map data by map information update unit in accordance with the first embodiment of the present invention.

FIG. 10A and FIG. 10B are diagrams showing map data after the update processing by the map information update unit in accordance with the first embodiment of the present invention, in which FIG. 10A is the diagram when the area of a loading site in the map data is decreased, and FIG. 10B is the diagram when the area of the loading site in the map data is increased.

FIG. 11 is a sequence diagram showing a flow of operation of each of a control center system, a hydraulic excavator and a dump truck in accordance with a second embodiment of the present invention.

FIG. 15 is a diagram illustrating an example configuration of operational data of the dump truck accumulated in a work machine information accumulation unit in accordance with the third embodiment of the present invention.

DESCRIPTION OF EMBODIMENTS

Embodiments of a map generation device in accordance with the present invention will be described below with reference to the accompanying drawings. In the following embodiments, a description is divided into a plurality of sections or embodiments if necessary for the sake of convenience. In the embodiments, where reference is made to a specific number of elements and/or the like (including numbers, numeric values, amounts, ranges, etc.), the specific number is not limited thereto, and any number greater or less than the specific number may be used unless otherwise specified, unless the specific number is limited thereto clearly in theory, and the like. It should be noted that in the following embodiment the element(s) (including a processing step(s) etc.) is not necessarily essential unless otherwise specified, unless the element(s) is considered to be essential clearly in theory, and the like.

Further, configurations, functions, processing units, processing means and the like in the following embodiments may each be implemented in part or in whole as, for example, an integrated circuit or any other hardware. Further, configurations, functions, processing units, processing means and the like, which will be described later, may be implemented as a program executed on a computer, that is, may also be implemented as software. Information regarding programs, tables, files and/or the like which implement each configuration, function, processing unit, processing means and/or the like may be stored in a storage device such as memory, hard disks, SSD (Solid State Drive) and/or the like, and/or on a storage medium such as IC cards, SD cards, DVDs and/or the like.

Embodiments of a map generation device in accordance with the present invention will now be described in detail with reference to the accompanying drawings. It should be noted that in all the drawings used to describe the embodiments, members having the same function are denoted by the same or related reference signs, and a repetitive description is omitted. Further, in the following embodiments, a description of the same or similar component is not repeated in principle except when necessary.

First Embodiment

Regarding a map generation device in accordance with a first embodiment of the present invention, work machines include haulage vehicles such as dump trucks hauling a load and the like, and loading machines such as hydraulic excavators, wheel loaders and the like to load the haulage vehicles with the load, by way of example. A feature of the map generation device is a configuration for generating travelable map information indicating an area capable of being travelled by the haulage vehicle.

Figure 1:
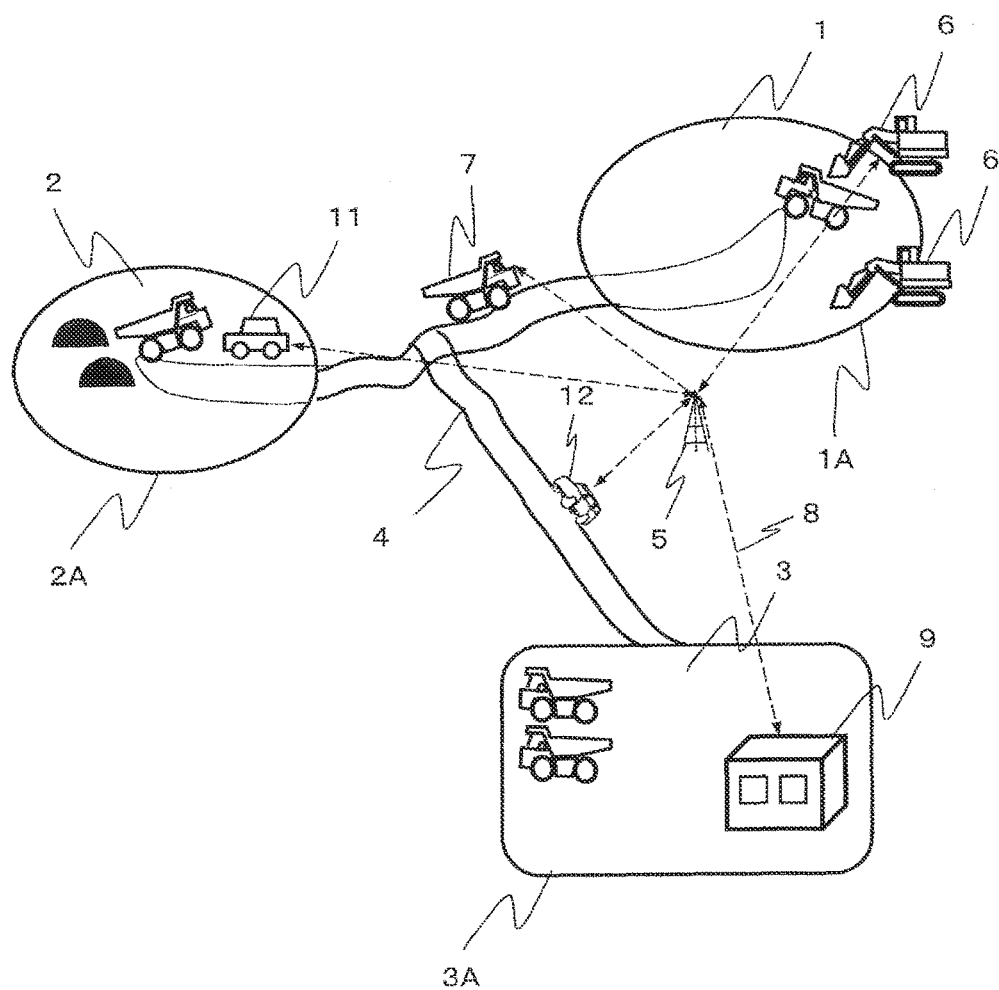
FIG. 1 is a diagram illustrating the overall layout of a mine in which a map generation device in accordance with a first embodiment of the present invention is used.

The map generation device 100 in accordance with the first embodiment of the preset invention is used, for example, in a mine illustrated in FIG. 1. The mine includes at least a loading site 1 and a dumping site 2 which are working sites, and a machine parking site 3, as well as transport courses 4 connecting the loading site 1, the dumping site 2 and the machine parking site 3 to each other, and a radio base station 5 located distance from the loading site 1, the dumping site 2, the machine parking site 3 and the transport courses 4. Two travel paths of the traveling directions opposite to each other are formed in each transport course 4.

The loading site 1 is a place where a loading machine 6 performs a loading work at a loading position to load minerals and/or topsoil layer on to a haulage vehicle 7. The loading machine 6 is equipped with, for example, a huge hydraulic excavator (hereinafter denoted by the same reference sign as that of the loading machine). The hydraulic excavator 6 is equipped with: a travel base; a revolving upperstructure mounted rotatably above the travel base through a swing frame; a front working assembly placed forward of the revolving upperstructure; a cab placed in the front of the revolving upperstructure for an operator on board; and an antenna placed on the top of the cab for connection to a wireless communication channel 8.

The front working assembly includes: a boom mounted in an elevatable manner with respect to the revolving upperstructure; an arm attached rotatably at the leading end of the boom; and a bucket attached rotatably at the leading end of the arm. The boom, the arm and the bucket are operated by the operator in the cab in such a manner as to rotate in the vertical direction in order to excavate minerals and/or topsoil layer and load them on to the haulage vehicle 7. Note that the loading machine is not limited to include the above-described hydraulic excavator 6, and may include a work machine such as a wheel loader or the like. Also, a description will be given later of a specific configuration showing the function of the hydraulic excavator 6 for implementing the map generation device in accordance with the first embodiment of the present invention.

Further, the dump truck 7 includes an antenna installed on an upper forward portion of the vehicle for connection to the wireless communication channel 8. Also, a description will be given later of a specific configuration showing the function of the dump truck 7 for implementing the map generation device in accordance with the first embodiment of the present invention.

The dumping site 2 is a place where the dump truck 7 dumps the transported minerals and/or topsoil layer. The machine parking site 3 is a place where the operators are replaced and the dump truck 7 is parked. A control center 9 in which the operators wait is provide within the machine parking site 3. In the control center 9, a control center system 10 (see FIG. 2) is installed to be operated by the operator to control the autonomous traveling of the dump truck 7. The control center system 10 transmits, for example, operational instructions to the hydraulic excavator 6 and the dump truck 7 via a later-described data collection unit 20 (see FIG. 2) to operate the hydraulic excavator 6 and the dump truck 7, respectively. The control center system 10 has a management system 101 to manage the operational status of the hydraulic excavator 6.

The loading site 1, the dumping site 2 and the machine parking site 3 in such a mine have respective boundaries 1A, 2A, 3A defining a travelable area and a non-travelable area for the dump truck 7. Then, the hydraulic excavator 6 performs the excavation work and the loading work in the vicinity of the boundary 1A of the loading site 1. The dump truck 7 travels within the boundaries 1A, 2A, 3A of the loading site 1, the dumping site 2 and the machine parking site 3 and along the transport course 4 and performs the dumping work within the boundary 2A of the dumping site 2.

Kinds of the dumping work includes a work for the dump truck 7 dumping minerals and/or topsoil layer toward the outside of the boundary 2A, a work for the dump truck 7 dumping minerals and/or topsoil layer to a predetermined position within the boundary 2A, and a work for the dump truck 7 dumping minerals and/or topsoil layer to change from one dumping position to another within the boundary 2A which is also called "paddock dumping".

The radio base station 5 is a base station to provide intercommunication connection between the hydraulic excavator 6, the dump truck 7 and the control center system 10 over the wireless communication channel 8. Radio waves in wireless communication from the hydraulic excavator 6, the dump truck 7 or the control center system 10 pass through the radio base station 5, thereby making reception/transmission of various kinds of information between the hydraulic excavator 6, the dump truck 7 and the control center system 10.

Further, in addition to the hydraulic excavator 6 and the dump truck 7, a work vehicle 11 and a light vehicle 12 for navigation measurement are in operation in the mine. The work vehicle 11 monitors whether or not the works are conducted with safety in the loading site 1 and the dumping site 2, and also performs a work of removing the dumped minerals and topsoil layer, and the like. The light vehicle 12 obtains and collects trajectory information which is to serve as the origin of travelable map information (hereinafter referred to as the "map data" for convenience sake) required for autonomous traveling of the dump truck 7.

The light vehicle 12 receives positioning radio waves from a GPS navigation satellite, not shown, to obtain a position of the vehicle's own (e.g., coordinate values).

The light vehicle 12 is equipped with, for example, a GPS receiver (not shown) mounted at a predetermined position of the vehicle, and saves trajectory information including an acquisition time and an own-vehicle position obtained through the GPS receiver as record information. Then, the light vehicle 12 transmits the saved trajectory information to the control center system 10 at predetermined time intervals over the wireless communication channel 8.

Figure 2:
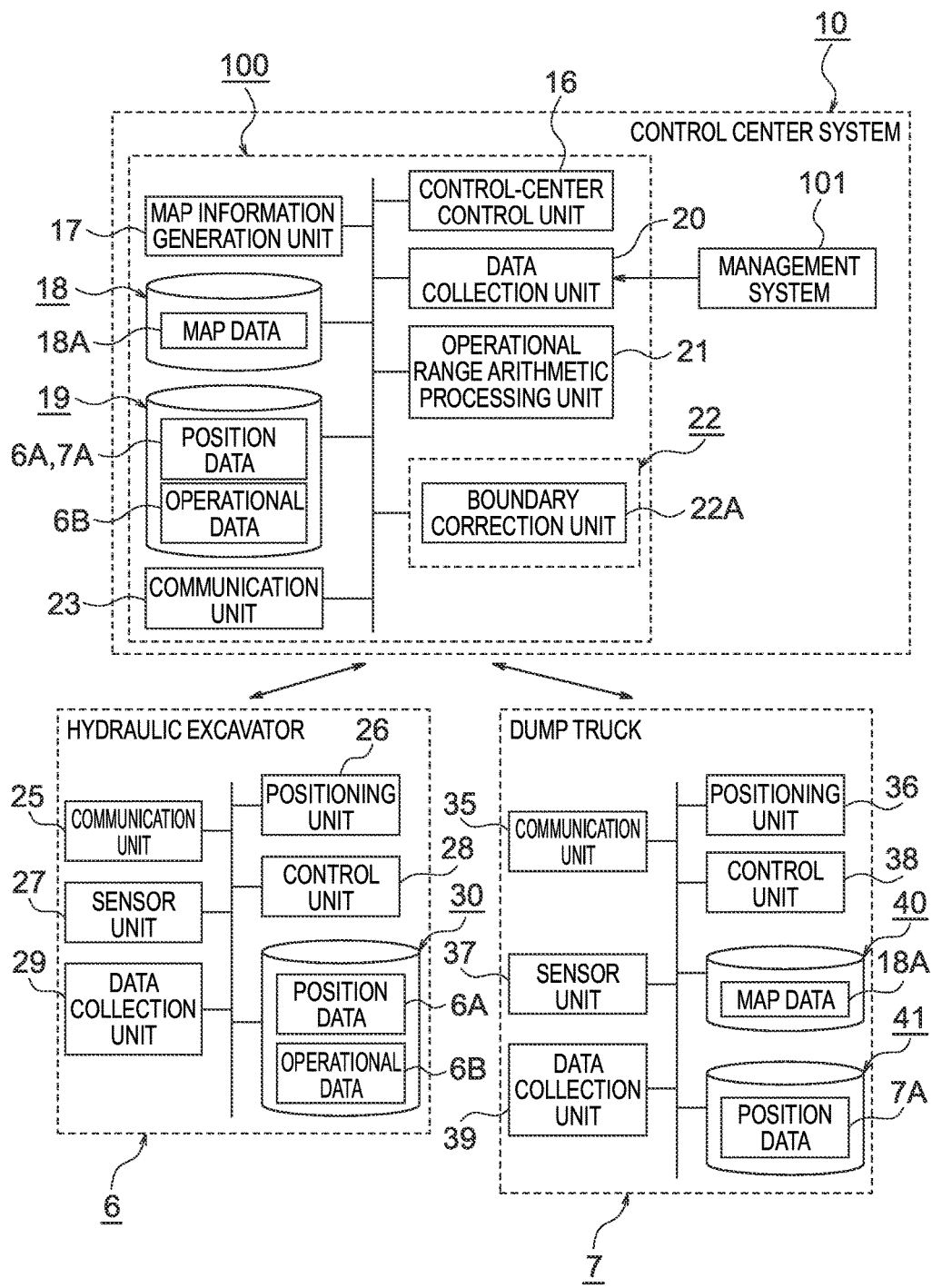
FIG. 2 is a function block diagram illustrating the configurations of a control center system, a hydraulic excavator and a dump truck in accordance with the first embodiment of the present invention.

The following description is given, in order with reference to FIG. 2, of each configuration showing functions of the control center system 10, hydraulic excavator 6 and the dump truck 7 for implementing the map generation device in accordance with the first embodiment of the present invention.

As shown in FIG. 2, the control center system 10 is equipped with a control-center control unit 16, map information generation unit 17, map information storage unit 18, work machine information accumulation unit 19, data collection unit 20, operational range arithmetic processing unit 21, map information update unit 22 and a communication unit 23, and the control center system 10 has a function as the map generation device 100 implemented by associating these units 16 to 23 with each other.

The control-center control unit 16 controls the operation of each element of the control center system 10, and is configured using, in addition to an arithmetic and control device such as CPU (Central Processing Unit) and/or the like: a storage device such as ROM (Read Only Memory), HDD (Hard Disk Drive) and/or the like to store programs executed by the control center system 10; and hardware including RAM (Random Access Memory) providing a workspace when CPU executes the programs.

The control-center control unit 16 also receives/transmits required information from/to later-described control units 28, 38 of respective the hydraulic excavator 6 and the dump truck 7 in order to control the operations of the hydraulic excavator 6 and the dump truck 7 on the basis of map data for controlling dispatch management and autonomous travelling of the dump truck 7.

The map information generation unit 17 generates map data 18A on the basis of the trajectory information collected by the light vehicle 12 and the dump truck 7. The map information storage unit 18 is configured with a device permanently storing information such as HDD and/or the like, and stores the map data 18A generated mainly by the map information generation unit 17. Incidentally, the processing of the map information generation unit 17 to generate the map data 18A will be described later in detail.

Figure 3:
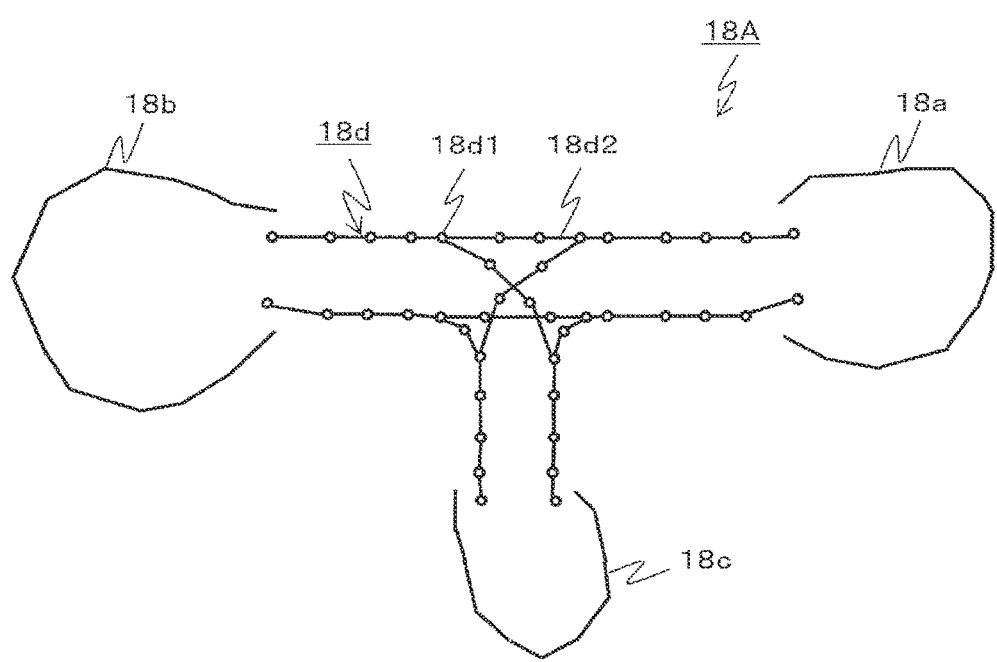
FIG. 3 is a diagram illustrating an example configuration of map data stored in a map information storage unit in accordance with the first embodiment of the present invention.

As shown in FIG. 3, the map data 18A includes boundaries 18a to 18c on the map corresponding to the respective boundaries 1A to 3A of the loading site 1, the dumping site 2 and the machine parking site 3, and a transport course 18d on the map corresponding to the transport course 4. The transport course 18d of the map data 18A includes position information (coordinate values) on each of nodes 18d1 defining the travel path on the transport course 4, and links 18d2 each connecting adjacent nodes 18d1 to each other. Note that the map data 18A may include mine topographic information and absolute coordinates of each node 18d1 (real three-dimensional coordinates calculated based on positioning radio waves). Incidentally, the nodes 18d1 and the links 18d2 are assigned identification information uniquely identifying each of the nodes 18d1 and links 18d2.

In FIG. 2, the work machine information accumulation unit 19 is configured with a device permanently storing information such as HDD and/or the like, and accumulates: position information indicating a position of the hydraulic excavator 6 collected by the data collection unit 20 (hereinafter referred to as the "position data" for convenience sake) 6A operational information indicating an operational status of the hydraulic excavator 6 (hereinafter referred to as the "operational data" for convenience sake) 6B; and position information indicating a position of the dump truck 7 (hereinafter referred to as the "position data" for convenience sake) 7A.

Figure 4A:
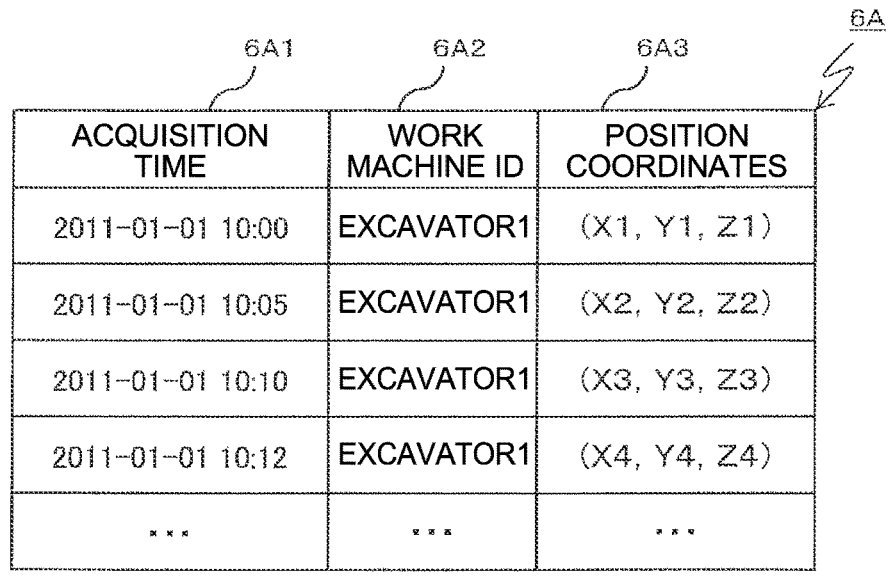

For example, as shown in FIG. 4A, the position data 6A of the hydraulic excavator 6 includes: an acquisition time 6A1; a work machine ID 6A2 pre-assigned to each hydraulic excavator 6 in the mine for identification of the hydraulic excavator 6; and position coordinates 6A3 representing the position of the hydraulic excavator 6 at the acquisition time 6A1 by use of latitude X, longitude Y and altitude Z coordinates. Note that the configuration of position data 7A of the dump truck 7 is similar to the configuration of the above position data 6A of the hydraulic excavator 6, and a repetitive description is omitted.

Figure 4B:
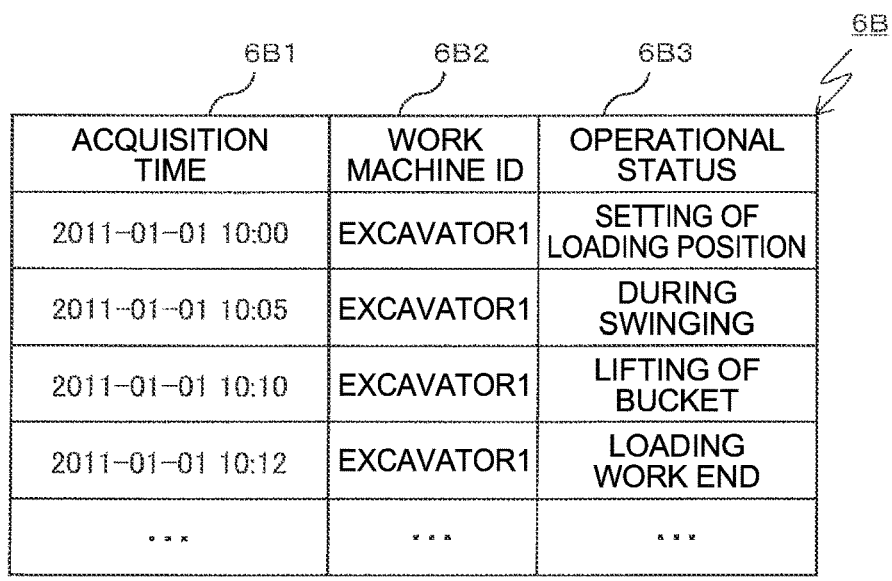

For example, as shown in FIG. 4B, the operational data 6B of the hydraulic excavator 6 includes: an acquisition time 6B1; a work machine ID 6B2 pre-assigned to each hydraulic excavator 6 in the mine for identification of the hydraulic excavator 6; and operational status 6B3 that is a column for a record of the status of a work performed by the hydraulic excavator 6 at the acquisition time 6B1. Thus, the position data 6A and the operational data 6B of the hydraulic excavator 6 are associated with each other in terms of the acquisition times 6A1, 6B1.

The data collection unit 20 collects the position data 6A and the operational data 6B of the hydraulic excavator 6 and the position data 7A of the dump truck 7 from the information received via the communication unit 23 by the control-center control unit 16. The operational range arithmetic processing unit 21 functions as an operational range arithmetic unit that calculates an operational range of the hydraulic excavator 6 on the basis of the position data 6A and the operational data 6B of the hydraulic excavator 6 out of the data 6A, 6B and 7A accumulated in the work machine information accumulation unit 19, and performs predetermined processing until the map information update unit 22 initiates the update processing on the map data 18A.

The map information update unit 22 verifies the operational range of the hydraulic excavator 6 calculated by the operational range arithmetic processing unit 21 against the map data 18A stored in the map information storage unit 18 in order to correct the boundary 18a of the loading site 1 in the map data 18A, thus updating the map data 18A.

Specifically, the map information update unit 22 includes a boundary correction unit 22A. The boundary correction unit 22A corrects the boundary 18a of the loading site 1 in the map data 18A such that the area of the loading site 1 is decreased when the operational range of the hydraulic excavator 6 calculated by the operational range arithmetic processing unit 21 is located within the boundary 18a of the loading site 1 in the map data 18A, whereas, when the operational range of the hydraulic excavator 6 calculated by the operational range arithmetic processing unit 21 is located on the boundary 18a and without the boundary 18a of the loading site 1 in the map data 18A, the boundary correction unit 22A corrects the boundary 18a of the loading site 1 in the map data 18A such that the area of the loading site 1 is increased.

The communication unit 23 establishes intercommunication connection between the outside-located dump truck 7 and the control center system 10 over the wireless communication channel 8.

The hydraulic excavator 6 is equipped with a communication unit 25, a positioning unit 26, a sensor unit 27, a control unit 28, a data collection unit 29, and a work machine information accumulation unit 30. Note that the communication unit 25 is similar to the above-described communication unit 23 of the control center system 10, and a repetitive description is omitted.

The positioning unit 26 receives positioning radio waves from a GPS navigation satellite, not shown, to obtain its own position. In the first embodiment according to the present invention, the positioning unit 26 obtains, for example, a position of the bucket as the position of the hydraulic excavator 6.

Specifically, the positioning unit 26 includes a GPS receiver installed in a predetermined position of the vehicle, and an attitude detection unit that detects the attitude of the front working assembly, which are not shown. The positioning unit 26 calculates the position of the bucket on the basis of the position obtained by the GPS receiver, the attitude detected by the attitude detection unit and the dimension information of the front working assembly. Note that the attitude detection unit is configured with, for example, an angle sensor detecting each of angles of the boom, the arm and the bucket. Also, arithmetic for the position of the bucket by the positioning unit 26 is not limited to the above, and may be performed by installing the GPS receiver directly to the bucket, by way of example.

The sensor unit 27 is configured with, for example, a sensor detecting obstruction around the vehicle such as a millimeter-wave radar, a camera and/or the like. The detection result of the sensor is displayed on a monitor (not shown) in the cab. Thus, the operator in the cab can easily determine the obstruction around the vehicle by checking the display on the monitor.

The control unit 28 controls the operation of each of elements of the hydraulic excavator 6, and is configured using, in addition to an arithmetic and control device such as CPU and/or the like: a storage device such as ROM, HDD and/or the like to store programs executed by the hydraulic excavator 6; and hardware including RAM providing a workspace when CPU executes the programs.

The data collection unit 29 collects, for example, positions of the bucket obtained by the positioning unit 26 at predetermined time intervals as the position data 6A, and also collects the operational data 6B of the hydraulic excavator 6. As concrete examples of the collection of the operational data 6B, the data collection unit 29 records information on instructions of the operator to the hydraulic excavator 6 in order to collect information on a status in which the loading position of the hydraulic excavator 6 is set (see FIG. 4B), a status in which the loading work of the hydraulic excavator 6 is completed (see FIG. 4B), and the like.

Also, the data collection unit 29 records the detection result of the attitude detection unit of the positioning unit 26 that monitors the operating conditions of the hydraulic excavator 6, in order to collect information on a status in which the revolving upperstructure is swinging (see FIG. 4B), a status in which the bucket is being rotated upward (see FIG. 4B), and the like. Note that the collection of the operational data 6B by the data collection unit 29 is not limited to the above, and may be performed by recording information on operation performed by the operator.

The work machine information accumulation unit 30 is configured with a device permanently storing information such as HDD and/or the like, and accumulates the position data 6A and the operational data 6B collected by the data collection unit 29. Further, the position data 6A accumulated in the work machine information accumulation unit 30 is transmitted at predetermined time intervals to the control center system 10 through the communication unit 25.

The dump truck 7 is equipped with a communication unit 35, a positioning unit 36, a sensor unit 37, a control unit 38, a data collection unit 39, a map information storage unit 40 and a work machine information accumulation unit 41. Note that the communication unit 25 is similar to the above-described communication unit 23 of the control center system 10, and a repetitive description is omitted.

The positioning unit 36 receives positioning radio waves from a GPS navigation satellite, not shown, to obtain its own position. In the first embodiment according to the present invention, the positioning unit 36 is configured with, for example, a GPS receiver installed in a predetermined position of the vehicle, so that a position of the dump truck 7 is obtained by the GPS receiver.

The sensor unit 37 includes a sensor detecting obstruction ahead of the vehicle in the traveling direction (the direction in which the vehicle is headed) such as a millimeter-wave radar, a camera and/or the like, and a sensor detecting a shoulder such as a lidar and/or the like. The detection results of the sensors are output to the control unit 38 to be used for acceleration/deceleration and monitoring of traveling positions such that the vehicle is not off the travel path under normal circumstances. In emergency, the detection results are used for braking operation required for emergency avoidance action.

The control unit 38 controls the operation of each of elements of the dump truck 7, and is configured using, in addition to an arithmetic and control device such as CPU and/or the like: a storage device such as ROM, HDD and/or the like to store programs executed by the hydraulic excavator 6; and hardware including RAM providing a workspace when CPU executes the programs.

The data collection unit 39 collects, for example, positions of the dump truck 7 obtained by the positioning unit 36 at predetermined time intervals as the position data 7A. The map information storage unit 40 is configured with a device permanently storing information such as HDD and/or the like, and stores the map data 18A received from the control center system 10.

The work machine information accumulation unit 41 is configured with a device permanently storing information such as HDD and/or the like, and accumulates the position data 7A collected by the data collection unit 39. Further, the position data 7A accumulated in the work machine information accumulation unit 41 is transmitted at predetermined time intervals to the control center system 10 through the communication unit 35 and then the position data 7A is utilized as trajectory information serving as the origin of the map data 18A by the map information generation unit 17 to generate the map data 18A.

The generation processing of the map data 18A performed by the map information generation unit 17 of the control center system 10 will now be described in detail with reference to FIG. 5.

Figure 5:
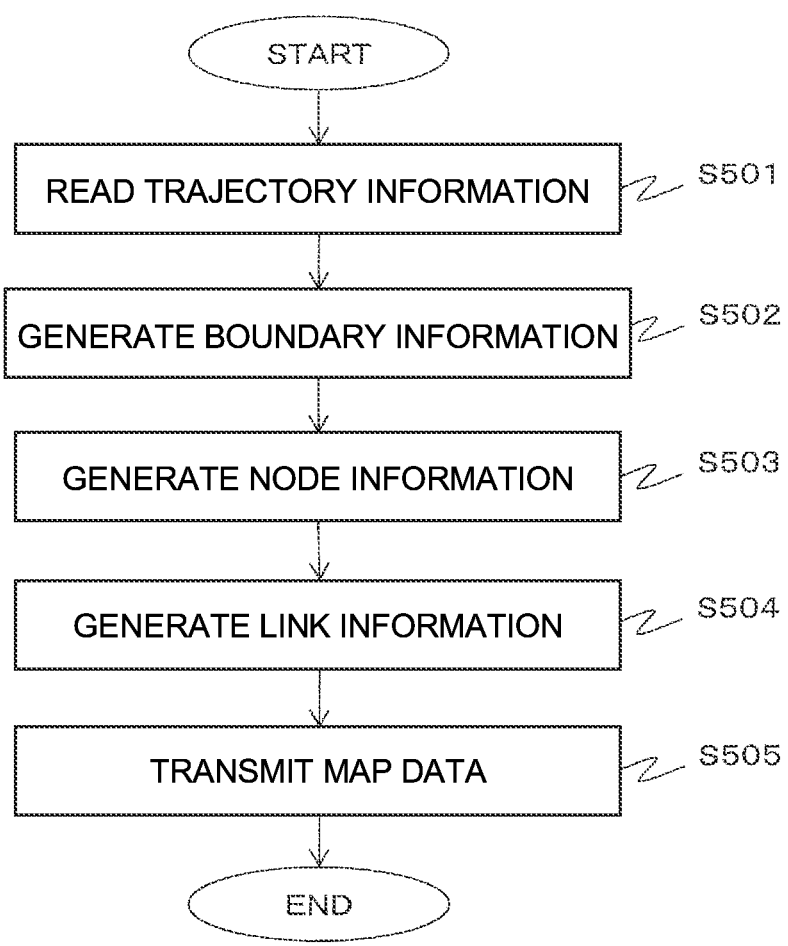
FIG. 5 is a flowchart showing a flow of generation processing of map data performed by a map information generation unit in accordance with the first embodiment of the present invention.

As shown in FIG. 5, the map information generation unit 17, initially, reads the trajectory information received from the light vehicle 12 or the dump truck 7 via the communication unit 23 (step (hereinafter referred to as "S") 501). Then, the map information generation unit 17 extracts the respective boundaries 18a to 18c of the loading site 1, the dumping site 2 and the machine parking site 3 from the travel trajectory of the light vehicle 12 or the dump truck 7 in order to generate boundary information (S502).

Then, the map information generation unit 17 generates node information on the basis of the trajectory information of the light vehicle 12 or the dump truck 7 (S503). Specifically, for generation of a transport course 18d on a map in the map data 18A, the map information generation unit 17 extracts, as position data, the positions of the light vehicle 12 or the dump truck 7 included in the trajectory information at, for example, predetermined time intervals or predetermined distance intervals. Then the map information generation unit 17 sets the extracted position data as position information of nodes 18d1. Then, the map information generation unit 17 assigns an ID as identification information for uniquely identifying each node 18d1, thus generating node information.

In contrast, for generation of a travel path within each of the boundaries 18a to 18c of the loading site 1, dumping site 2 and the machine parking site 3 in the map data 18A, the map information generation unit 17 uses, for example, predetermined means to generate travel paths extending respectively from the entrances of the loading site 1, the dumping site 2 and the machine parking site 3 to a loading position of the hydraulic excavator 6, to a dumping position of the dump truck 7 and to a stop position of the dump truck 7, thereby setting position information of nodes (not shown) at predetermined distance intervals for generation of node information The map information generation unit 17 then generates link information representing the connection relationship of the links 18d2 each connecting adjacent nodes 18d1 (S504). Specifically, the map information generation unit 17 makes connections between two nodes 18d1 obtained respectively at the acquisition times close to each other, on the basis of the acquisition times included in the trajectory information of the light vehicle 12 or the dump truck 7, thus generating link information. At this time, the processing is performed to assume that two nodes close to each other with a difference between the acquisition times falling below a threshold is the same node. This makes it possible to represent a road structure with branches such as intersections and/or the like by means of the connection relationship of the links 18d2.

In this manner, after the map information generation unit 17 generates the boundary information, the node information and the link information to generate the map data 18A, the map information generation unit 17 transmits the map data 18A thus generated to the dump truck 7 via the communication unit 23 (S505). This completes the generation processing of the map data 18A by the map information generation unit 17.

The operation of each of the control center system 10, the hydraulic excavator 6 and the dump truck 7 will now be described in detail with reference to FIG. 6. In particular, the description focuses mainly on the transmission of information between the control-center control unit 16 of the control center system 10, the control unit 28 of the hydraulic excavator 6 and the control unit 38 of the dump truck 7.

Figure 6:
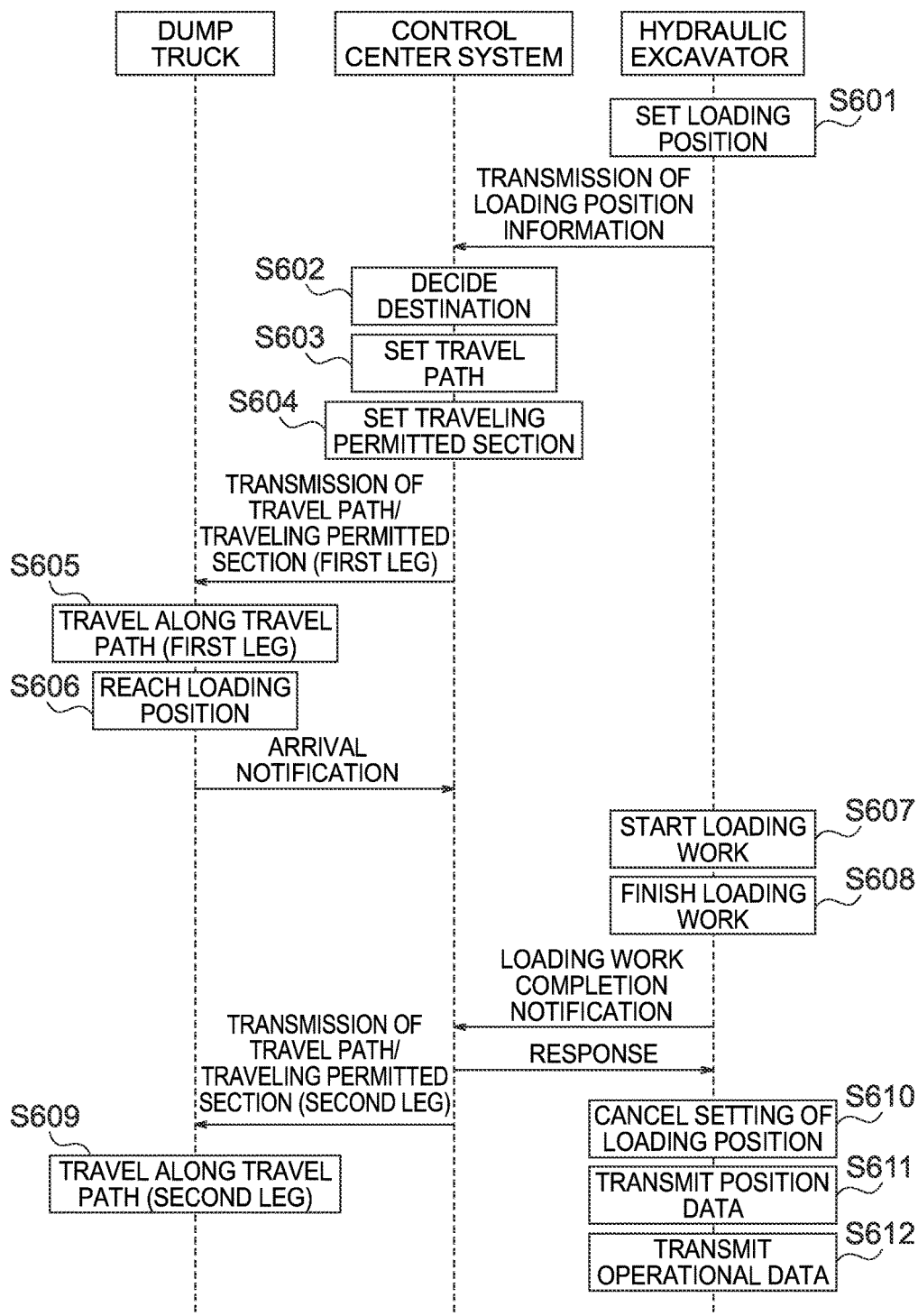
FIG. 6 is a sequence diagram showing a flow of operation of each of the control center system, the hydraulic excavator and the dump truck in accordance with the first embodiment of the present invention.

As shown in FIG. 6, initially, the control unit 28 of the hydraulic excavator 6 sets a loading position of the hydraulic excavator 6 (S601). Specifically, upon the operator in the cap operating the hydraulic excavator 6, the control unit 28 sets the position of the bucket obtained by the positioning unit 26 to be a loading position, and then transmits the loading position information to the control center system 10.

Then, the control-center control unit 16 of the control center system 10 determines a destination of the dump truck 7 on the basis of the loading position information received from the hydraulic excavator 6 (S602). After that, the control-center control unit 16 sets a travel path of the dump truck 7 to the destination determined in S602 (S603).

Specifically, for the setting, the control-center control unit 16 designates a point sequence of nodes 18d1 of a transport path 18d in the map data 18A stored in the map information storage unit 18, as a travel path from a departure point of the dump truck 7 to the entrance of the loading site 1. Further, the control-center control unit 16 generates dynamically a point sequence of nodes 18d1 as a travel path from the entrance of the loading site 1 to the destination determined in S602, that is, the loading position of the hydraulic excavator 6 in order to set the travel path.

Next, based on the travel path set in S603, the control-center control unit 16 sets a travelable section for the dump truck 7 in the travel path (hereinafter referred to as the "traveling permitted section" for convenience sake) so that interference is prevented from occurring between dump trucks 7 (S604). Then, the control-center control unit 16 transmits the travel path of the dump truck 7 and the traveling permitted section to the dump truck 7 via the communication unit 23.

Next, the control unit 38 of the dump truck 7 recognizes the own-vehicle position and an ambient environment through the positioning unit 36 and the sensor unit 37, and then controls the operation of the dump truck 7 so that the dump truck 7 travels along the travel path and the travelling permitted section received from the control-center control unit 16. This causes the dump truck 7 to travel along the first leg of the travel path from a departure place toward a destination (S605). Then, upon the dump truck 7 arriving at the loading position of the hydraulic excavator 6 which is the destination (S606), the control unit 38 transmits arrival notification that the dump truck 7 has arrived at the loading position, to the control center system 10 via the communication unit 35.

In contrast, after the operator in the cab of the hydraulic excavator 6 visually ensures that the dump truck 7 arrives at the loading position, the hydraulic excavator 6 commences the work of loading the dump truck 7 as directed by the operation of the operator (S607). Then, upon completion of the work of loading the dump truck 7 (S608), the control unit 28 transmits completion notification that the loading work has been completed, to the control center system 10 via the communication unit 25.

Upon reception of the completion notification about the loading work, the control-center control unit 16 of the control center system 10 transmits the travel path and the traveling permitted section from the loading position of the hydraulic excavator 6 to the next destination to the dump truck 7 via the communication unit 23.

Next, the control unit 38 of the dump truck 7 recognizes the own-vehicle position and an ambient environment through the positioning unit 36 and the sensor unit 37, and then controls the operation of the dump truck 7 so that the dump truck 7 travels along the travel path and the travelling permitted section received from the control-center control unit 16. This causes the dump truck 7 to travel along the second leg of the travel path from the loading position of the hydraulic excavator 6 toward the next destination (S609).

In contrast, the control unit 28 of the hydraulic excavator 6 cancels the setting of the loading position set in S601 (S610). Then, the control unit 28 transmits the position data 6A of the hydraulic excavator 6 accumulated in the work machine information accumulation unit 30 (S611) so that the position data 6A is accumulated in the work machine information accumulation unit 19 of the control center system 10. Then, the control unit 28 transmits the operational data 6B of the hydraulic excavator 6 accumulated in the work machine information accumulation unit 30 (S612) so that the operational data 6B is accumulated in the work machine information accumulation unit 19 of the control center system 10.

Arithmetic processing for an operational range of the hydraulic excavator 6 performed by the operational range arithmetic processing unit 21 of the control center system 10 will now be described in detail with reference to FIG. 7 and FIG. 8.

Figure 7:
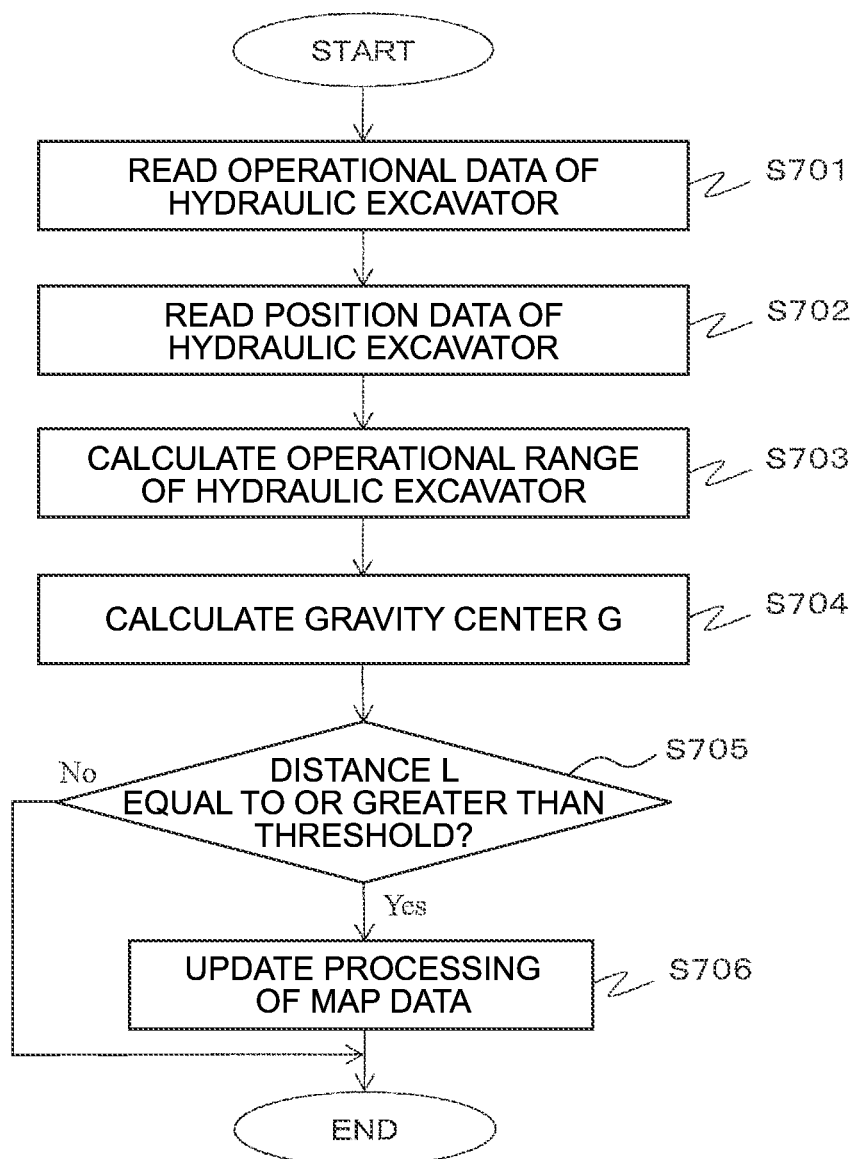
FIG. 7 is a flowchart showing a flow of arithmetic processing for an operational range of the hydraulic excavator performed by an operational range arithmetic processing unit in accordance with the first embodiment of the present invention.

As shown in FIG. 7, the operational range arithmetic processing unit 21 reads the operational data 6B of the hydraulic excavator 6 accumulated in the work machine information accumulation unit 19 (S701), and then reads the position data 6A of the hydraulic excavator 6 accumulated in the work machine information accumulation unit 19 (S702). Then, the operational range arithmetic processing unit 21 calculates an operational range of the hydraulic excavator 6 from a predetermined operational status of the hydraulic excavator 6 in the operational data 6B and also from a position of the hydraulic excavator 6 associated with the predetermined operational status in the position data 6A.

Figure 8:
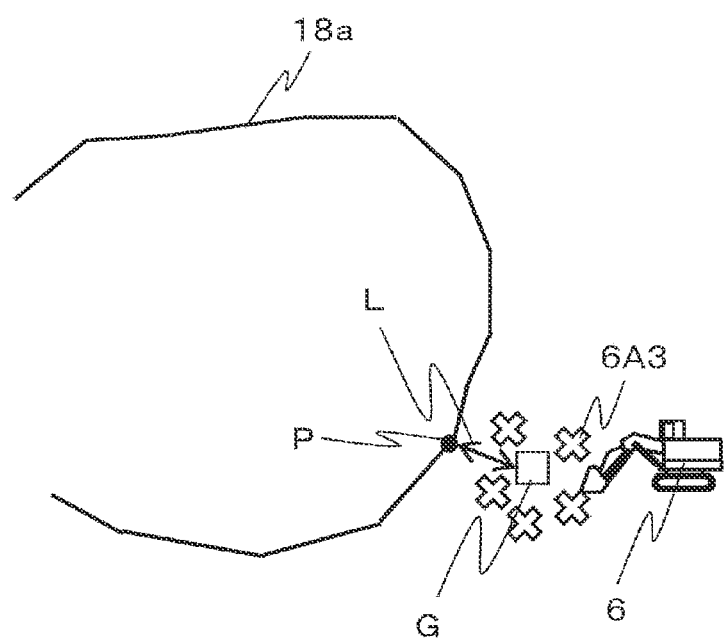
FIG. 8 is a diagram illustrating a process of arithmetic performed for the operational range of the hydraulic excavator by the operational range arithmetic processing unit in accordance with the first embodiment of the present invention.

Specifically, since the position data 6A and the operational data 6B are associated with each other in terms of the acquisition times 6A1, 6B1, the operational range arithmetic processing unit 21 uses the acquisition time 6B1 included in the operational data 6B as a key to search the position data 6A of the hydraulic excavator 6 for position coordinates 6A3 falling within a predetermined time period from the acquisition time 6A1 concurrent with the acquisition time 6B1, as shown in FIG. 8, thereby calculating the operational range of the hydraulic excavator 6 (S703).

Specifically, the operational range arithmetic processing unit 21 searches the position data 6A of the hydraulic excavator 6 for position coordinates 6A3 falling within a predetermined time period from, for example, the time at which the completion of the loading work of the hydraulic excavator 6 is notified. As a result, the operational range arithmetic processing unit 21 is able to quickly determine the operational range of the hydraulic excavator 6 in a status close to the time of completion of the loading work of the hydraulic excavator 6 as a predetermined operational status of the hydraulic excavator 6.

Next, the operational range arithmetic processing unit 21 performs arithmetic to determine, for example, a gravity center position G at the position coordinates 6A3 retrieved in S703 as a predetermined reference point of the operational range of the hydraulic excavator 6 calculated in S703 (S704). Then, the operational range arithmetic processing unit 21 determines whether or not a distance L between the gravity center position G obtained in S704 and a point P of the boundary 18a of the loading site 1 in the map data 18A stored in the map information storage nit 18, the point P being closest to the gravity center position G (hereinafter referred to as the "closest contact point" for convenience sake) is equal to or greater than a predetermined threshold (S705).

At this time, if the operational range arithmetic processing unit 21 is determined that the distance L between the gravity center position G obtained in S704 and the closest contact point P of the boundary 18a of the loading site 1 in the map data 18A is less than the predetermined threshold (S705/No), the arithmetic processing for the operational range of the hydraulic excavator 6 is terminated in the operational range arithmetic processing unit 21. In contrast, at S705, if the operational range arithmetic processing unit 21 is determined that the distance L between the gravity center position G obtained in S704 and the closest contact point P of the boundary 18a of the loading site 1 in the map data 18A is equal to or greater than the predetermined threshold (S705/Yes), the update processing of the map data 18A by the map information update unit 22 follows (S706), and the arithmetic processing for the operational range of the hydraulic excavator 6 by the operational range arithmetic processing unit 21 is terminated.

Figure 10A:
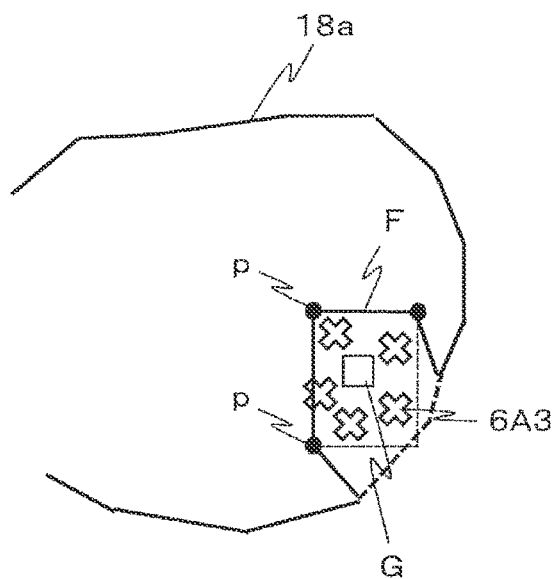
Figure 10B:
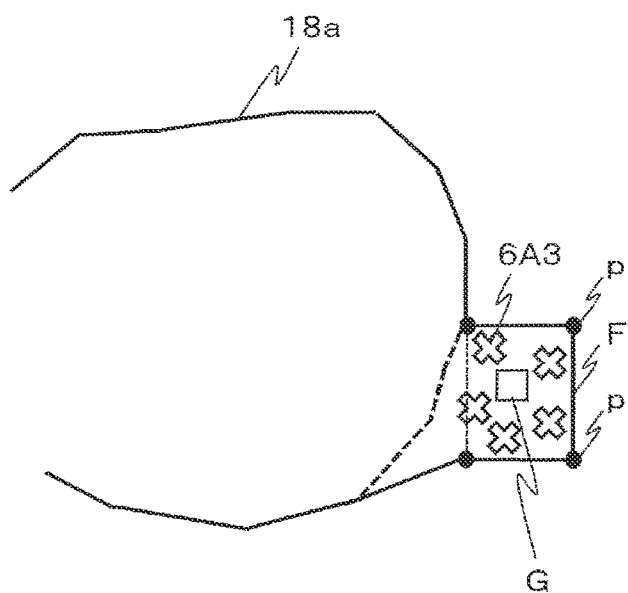

The update processing of the map data 18A by the map information update unit 22 of the control center system 10 will now be described in detail with reference to FIG. 9 and FIG. 10A and FIG. 10B.

As shown in FIG. 9, the map information update unit 22 sets a circumscribed rectangle F (see FIG. 10A and FIG. 10B) of the position coordinates 6A3 retrieved in S703 by the operational range arithmetic processing unit 21 (S901). Then, the map information update unit 22 determines whether or not the gravity center position G found in S704 by the operational range arithmetic processing unit 21 is located within the boundary 18a of the loading site 1 in the map data 18A (S902).

At this time, if the map information update unit 22 determines that the gravity center position G found in S704 by the operational range arithmetic processing unit 21 is located within the boundary 18a of the loading site 1 in the map data 18A (S902/Yes), it is determined whether or not an endpoint p of the circumscribed rectangle F set in S901 (see FIG. 10A and FIG. 10B) is located within the boundary 18a of the loading site 1 in the map data 18A (S903).

If the map information update unit 22 determines at step S903 that the endpoint p of the circumscribed rectangle F set in S901 is not located within the boundary 18a of the loading site 1 in the map data 18A (S903/No), the processing in S905 described later is performed. In contrast, if the map information update unit 22 determines at step S903 that the endpoint p of the circumscribed rectangle F set in S901 is located within the boundary 18a of the loading site 1 in the map data 18A (S903/Yes), the boundary correction unit 22A of the map information update unit 22 adds the endpoint p to temporary map data 18A as a point forming part of the boundary 18a of the loading site 1 of the map data 18A (S904).

Then, the map information update unit 22 confirms whether or not the determination in S903 has been made on all the endpoints p of the circumscribed rectangle F set in S901 (S905). At this time, if the map information update unit 22 confirms that the determination in S903 has not been made on all the endpoints p of the circumscribed rectangle F set in S901 (S905/No), the processing steps from S903 are repeated.

In S905, if the map information update unit 22 confirms that the determination in S903 has been made on all the endpoints p of the circumscribed rectangle F set in S901 (S905/Yes), the boundary correction unit 22A corrects the boundary 18a of the loading site 1 in the map data 18A such that the boundary 18a passes through the endpoints p of the circumscribed rectangle F added to the temporary map data 18A in S904 in order to update the map data 18A (S906). As a result, as shown in FIG. 10A, the area of the loading site 1 in the map data 18A is decreased.

In contrast, if the map information update unit 22 determines in S902 that the gravity center position G acquired in S704 by the operational range arithmetic processing unit 21 is not located within the boundary 18a of the loading site 1 in the map data 18A, or that the gravity center position G is located on the boundary 18a and without the boundary 18a of the loading site 1 in the map data 18A (S902/No), it is determined whether or not the endpoints p of the circumscribed rectangle F set in S901 are located without the boundary 18a of the loading site 1 in the map data 18A (S907).

If the map information update unit 22 determines in S907 that the endpoints p of the circumscribed rectangle F set in S901 are not located without the boundary 18a of the loading site 1 in the map data 18A (S907/No), the processing at S909 described later is performed. In contrast, if the map information update unit 22 determines in S907 that the endpoints p of the circumscribed rectangle F set in S901 are located without the boundary 18a of the loading site 1 in the map data 18A (S907/Yes), the boundary correction unit 22A of the map information update unit 22 adds the endpoints p to temporary map data 18A as points forming part of the boundary 18a of the loading site 1 of the map data 18A (S908).

Then, the map information update unit 22 confirms whether or not the determination in S907 has been made on all the endpoints p of the circumscribed rectangle F set in S901 (S909). At this time, if the map information update unit 22 confirms that the determination in S907 has not been made on all the endpoints p of the circumscribed rectangle F set in S901 (S909/No), the processing steps from S907 are repeated.

In S909, if the map information update unit 22 confirms that the determination in S907 has been made on all the endpoints p of the circumscribed rectangle F set in S901 (S909/Yes), a confirmation instruction for confirming the boundary 1A of the loading site 1 is transmitted to, for example, the manned work vehicle 11 in the mine via the communication unit 23. Upon reception of the confirmation instruction from the control cemetery system 10, the operator in the cab performs visual confirmation work and then the work vehicle 11 transmits to the control center system 10 a completion notification on confirmation work that the confirmation work is completed.

This makes it possible to avoid the dump truck 7 from autonomously traveling in an area in which the dump truck 7 has never traveled, without actual confirmation before the map information update unit 22 updates the map data 18A to increase the area of the loading site 1 in the map data 18A. Therefore, safety of the dump truck 7 autonomously traveling in the mine can be sufficiently improved. It is noted that instead of the transmission of the above confirmation instruction, the above confirmation instruction may be automatically delivered from the control center system 10 to the work vehicle 11 or may be provided by a call from the operator in the control center system 10 to the work vehicle 11. In another way, the above confirmation instruction may be transmitted from the control center system 10 to a manned work machine such as the hydraulic excavator 6 and/or the like rather than the work vehicle 11. Further, the above-described processing in S910 and S911 may be omitted.

Next, the map information update unit 22 determines, based on the presence/absence of the completion notification on confirmation work from the work vehicle 11, whether or not the work vehicle 11 has completed the confirmation work (S911). At this time, if the map information update unit 22 receives the completion notification on confirmation work from the work vehicle 11 and therefore determines that the work vehicle 11 has completed the confirmation work (S911/Yes), the boundary correction unit 22A corrects the boundary 18a of the loading site 1 in the map data 18A such that the boundary 18a passes through the endpoints p of the circumscribed rectangle F added to the temporary map data 18A in S908 in order to update the map data 18A (S906). As a result, as shown in FIG. 10B, the area of the loading site 1 in the map data 18A is increased.

In S911, in contrast, if the map information update unit 22 does not receive the completion notification on confirmation work within a predetermined time period, for example, from the work vehicle 11 and therefore determines that the work vehicle 11 has not completed the confirmation work (S911/Yes), the update processing of the map data 18A by the map information update unit 22 is terminated without updating the map data 18A.

According to the first embodiment of the present invention in this manner of the configuration, the map information update unit 22 verifies the operational range of the hydraulic excavator 6 calculated by the operational range arithmetic processing unit 21 against the map data 18A stored in the map information storage unit 18, so that the operational status of the hydraulic excavator 6 is taken into account when the map data 18A is updated. This makes it possible to correct, in an appropriate manner, the boundary 18a on the map data 18A varying with reference to the operational status of the hydraulic excavator 6. Thus, the extraction accuracy for the boundary 18a of the loading site 1 in the map data 18A can be improved, leading to improved safety of working with the hydraulic excavators 6 and the dump trucks 7 in the mine.

Further, in the first embodiment of the present invention, based on the positional relationship between the boundary 18a of the loading site 1 in the map data 18A and a predetermined reference point of an operational range of the hydraulic excavator 6 calculated by the operational range arithmetic processing unit 21, that is, a gravity center position G at position coordinates 6A3 in the position data 6A when the hydraulic excavator 6 is in a predetermined operational status, the map information update unit 22 is capable of decreasing or increasing the area of the loading site 1 in the map data 18A. This makes it possible to reflect the operational status of the hydraulic excavator 6 into the correction of the boundary 18a of the loading site 1 in the map data 18A to a sufficient degree.

Accordingly, when the hydraulic excavator 6 performs the loading work or the like in the loading site 1, the map information update unit 22 decreases the range of the loading site 1 in the map data 18A. Thus, if the dump truck 7 autonomously travels along the travel path in the loading site 1, the dump truck is able to be prevented from coming into physical contact with the hydraulic excavator 6 within the loading site with reliability. In contrast, when the hydraulic excavator 6 is located beyond the boundary 1A of the loading site 1 to excavate minerals and/or topsoil layer, the map information update unit 22 increases the area or the loading site 1 in the map data 18A. Thus, after the excavation work of the hydraulic excavator 6 is completed, the dump truck 7 can travel in a place resulting from the increase of the area of the loading site 1, so that the travel path of the dump truck 7 in the loading site 1 can be increased. As a result, the load haulage work of the dump truck 7 can be performed with a high degree of efficiency.

Second Embodiment

In a second embodiment in accordance with the present invention, in addition to the configuration of the above first embodiment, for example, the operational range arithmetic processing unit 21 further calculates an operational range of the dump truck 7 from a position of the dump truck 7 associated with a predetermined operational status in the position data 7A accumulated in the work machine information accumulation unit 19. The map information update unit 22 verifies the operational ranges of the hydraulic excavator 6 and the dump truck 7 calculated by the operational range arithmetic processing unit 21 against the map data 18A stored in the map information storage unit 18 in order to correct the boundary 18a of the loading site 1 in the map data 18A, thus updating the map data 18A. The configuration in the second embodiment except for this point is the same as the configuration in the first embodiment, in which the same reference signs are used for the same or corresponding components, and a repetitive description is omitted.

The operation of each of the control center system 10, the hydraulic excavator 6 and the dump truck 7 in accordance with the second embodiment of the present invention will now be described in detail with reference to FIG. 11.

About the operation of each of the control center system 10, the hydraulic excavator 6 and the dump truck 7 in accordance with the second embodiment of the present invention, as shown in FIG. 11, the operation is essentially the same as the aforementioned operation steps in S601 to S612 as shown in FIG. 6, but the operation in S1101 is performed after the operation in S609. Specifically, in S609, the dump truck 7 travels along the second leg of the travel path from the loading position of the hydraulic excavator 6 toward the next destination. Then, upon arrival at the next destination, in S1101, the control unit 38 of the dump truck 7 transmits the position data 7A of the dump truck 7 accumulated in the work machine information accumulation unit 41 to the control center system 10 via the communication unit 35.

Next, arithmetic processing for operational ranges of the hydraulic excavator 6 and the dump truck 7 performed by the operational range arithmetic processing unit 21 of the control center system 10 in accordance with the second embodiment of the present invention is described in detail with reference to FIG. 12 and FIG. 13.

Figure 12:
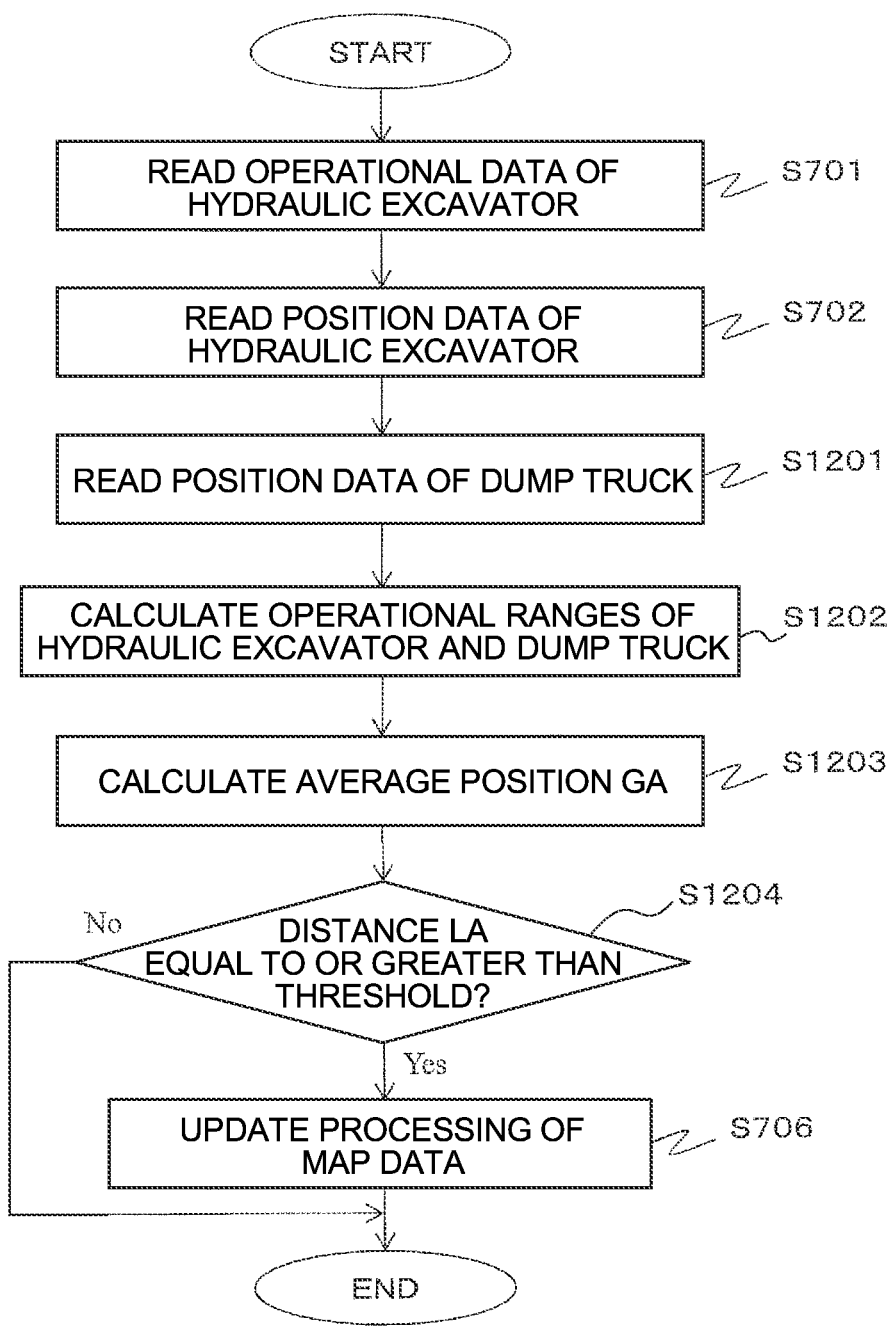
FIG. 12 is a flowchart showing a flow of arithmetic processing for operational ranges of the hydraulic excavator and the dump truck performed by an operational range arithmetic processing unit in accordance with the second embodiment of the present invention.
Figure 13:
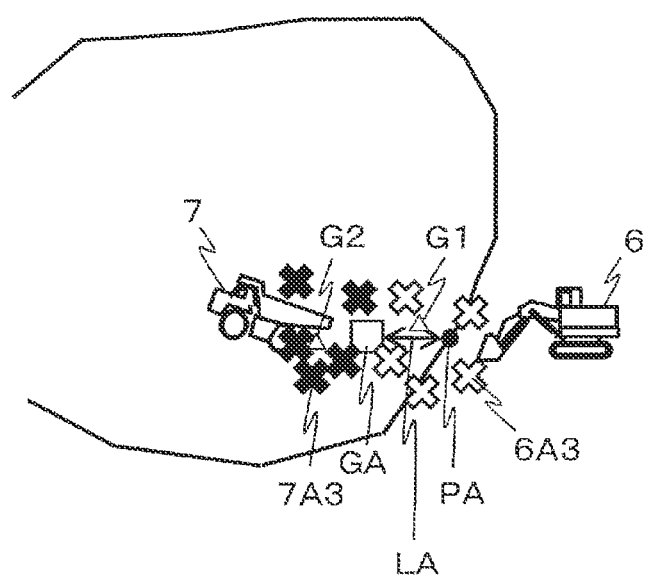
FIG. 13 is a diagram illustrating a process of arithmetic performed for the operational ranges of the hydraulic excavator and the dump truck by the operational range arithmetic processing unit in accordance with the second embodiment of the present invention.

Regarding the arithmetic processing for an operational range of the hydraulic excavator 6 performed by the operational range arithmetic processing unit 21 of the control center system 10 in accordance with the second embodiment of the present inventions, as shown in FIG. 12, the operation is essentially the same as the aforementioned operation steps in S701 to S706 shown in FIG. 7, but the processing steps of S1201 to S1204 are performed instead of the processing steps of S703 to S705.

Specifically, subsequent to the processing in S702, the operational range arithmetic processing unit 21 reads the position data 7A of the dump truck 7 accumulated in the work machine information accumulation unit 19 (S1202). Then, the operational range arithmetic processing unit 21 uses the acquisition time 6B1, included in the operational data 6B of the hydraulic excavator 6 accumulated in the work machine information accumulation unit 19, as a key to retrieve position coordinates 6A3 from the position data 6A of the hydraulic excavator 6 and position coordinates 7A3 from the position data 7A of the dump truck 7, the position coordinates 6A3 and 7A3 falling within a predetermined time period from the acquisition time 6A1 concurrent with the acquisition time 6B1, as shown in FIG. 13, and thereby the operational range arithmetic processing unit 21 calculates the operational ranges of the hydraulic excavator 6 and the dump truck 7 (S1202).

Then, as a predetermined reference point of the operational range of the hydraulic excavator 6 calculated in S1202, the operational range arithmetic processing unit 21 calculates, for example, a gravity center position G1 at the position coordinates 6A3 and a gravity center position G2 at the position coordinates 7A3 in the position data 7A of the dump truck 7, the position coordinates 6A3, 7A3 being retrieved in S1202, and the operational range arithmetic processing unit 21 takes an average position GA of the gravity positions G1 and G2 (S1203). Then, the operational range arithmetic processing unit 21 determines whether or not a distance LA between the average position GA obtained in S1203 and a point PA of the boundary 18a of the loading site 1 in the map data 18A stored in the map information storage nit 18, the point PA being closest to the average position GA (hereinafter referred to as the "closest contact point" for convenience sake), is equal to or greater than a predetermined threshold (S1204).

According to the second embodiment of the present invention in this manner of the configuration, in addition to similar advantageous effects to those in the aforementioned first embodiment, since the operational range of the dump truck 7 as well as the operational range of the hydraulic excavator 6 are taken into account in the update processing of the map data 18A, the map information update unit 22 is able to accurately determine whether or not the predetermined reference point of the hydraulic excavator 6 calculated by the operational range arithmetic processing 21 is located within the boundary 18a of the loading site 1 in the map data 18A. This makes it possible to achieve improved accuracy for the extraction of the boundary 18a of the loading site 1 in the map data 18A in consideration of movement of the dump truck 7.

Third Embodiment

Figure 14:
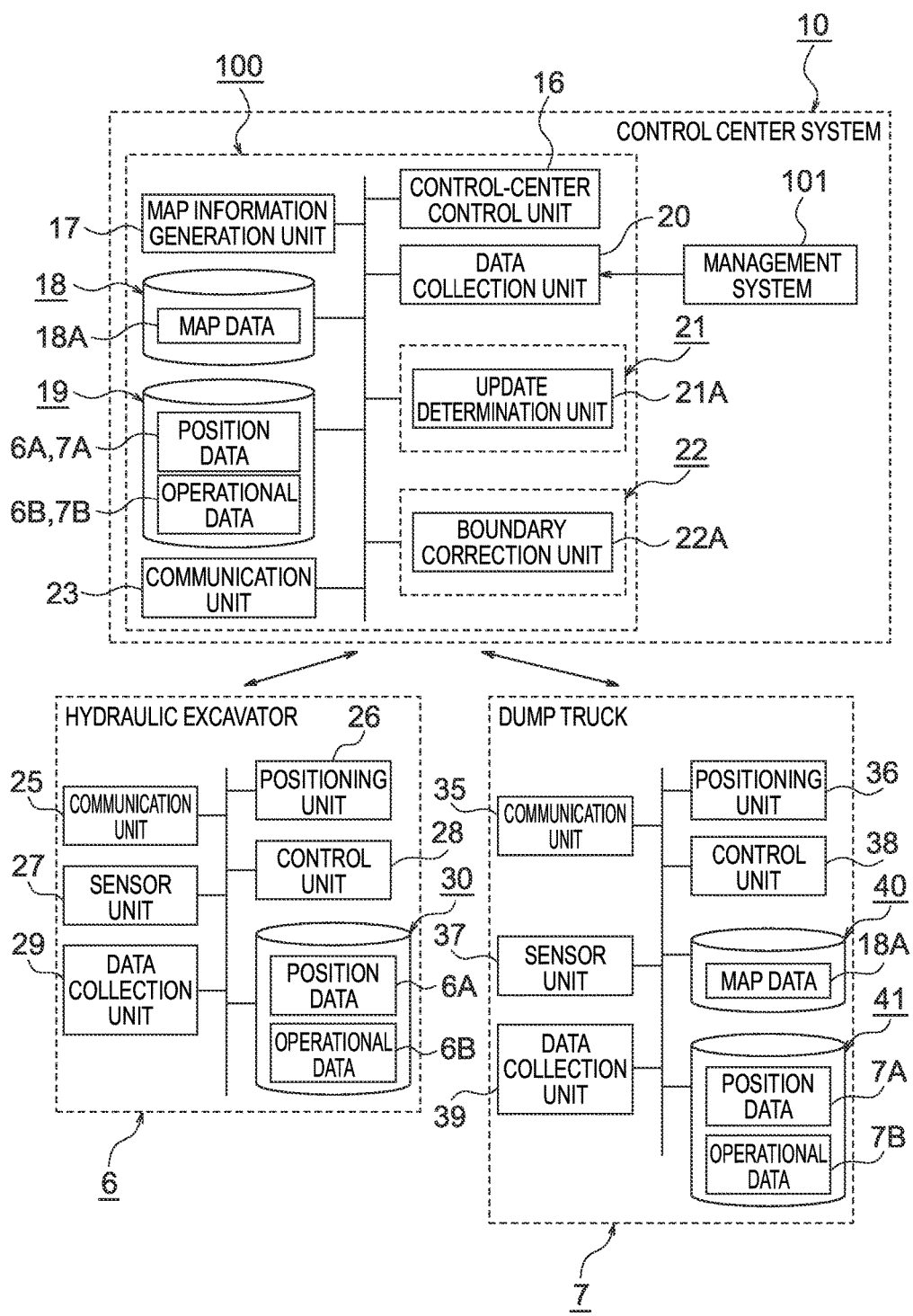
FIG. 14 is a function block diagram illustrating the configurations of a control center system, a hydraulic excavator and a dump truck in accordance with a third embodiment of the present invention.

Describing a difference of a third embodiment in accordance with the present invention from the first embodiment, the map information update unit 22 in accordance with the first embodiment corrects the boundary 18a of the loading site 1 in the map data 18A stored in the map information storage unit 18 in order to update the map data 18a. In contrast, the map information update unit 22 in accordance with the third embodiment verifies the operational range of the dump truck 7 calculated by the operational range arithmetic processing unit 21 against the map data 18A stored in the map information storage unit 18 as shown in FIG. 14, by way of example. Thereby, the boundary 18b (see FIG. 3) of the dumping site 2 in the map data 18A is corrected for update of the map data 18A.

In this case, the data collection unit 39 of the dump truck 7 records, for example, operation information and/or instruction information provided to the dump truck 7 from the operator waiting in the control center 9 in the machine parking site 3, as operational instruction to be transmitted to the dump truck 7 from the management system 101 of the control center system 10, thereby collecting the operational data 7B of the dump truck 7. Then, the work machine information accumulation unit 41 accumulates the operational data 7B of the dump truck 7 collected by the data collection unit 39, in addition to the position data 7A of the dump truck 7.

As shown in FIG. 15, the operational data 7B of the dump truck 7 is essentially the same configuration as that of the aforementioned operational data 6b of the hydraulic excavator 6 shown in the FIG. 4B, and includes an acquisition time 7B1; a work machine ID 7B2; and operational status 7B3. The work machine ID 7B2 is pre-assigned to each dump truck 7 in the mine for identification of the dump truck 7. Also, concrete examples of the operational status 7B3 includes a status in which the dump truck 7 reaches the dumping position, a status in which the load body (body) is being rotated upward, a status in which the load body is being rotated downward, and the like.

Further, in the third embodiment in accordance with the present invention, as shown in FIG. 14, the operational range arithmetic processing unit 21 includes an update determination unit 21A for a determination about whether or not the map information update unit 22 should update the map data 18A based on the kind of load dumping work of the dump truck 7. In this case, for example, if the dump truck 7 dumps the loads to the same point of the dumping site 2 a predetermined number of times, the update determination unit 21A determines to perform an update to the map data 18A. If the dump truck 7 does not dumps the loads to the same point of the dumping site 2 a predetermined number of times, the update determination unit 21A determines to perform no update to the map data 18A. The configuration in the third embodiment except for this point is the same as the configuration in the first embodiment, in which the same reference signs are used for the same or corresponding components, and a repetitive description is omitted.

The operation of each of the control center system 10 and the dump truck 7 in accordance with the third embodiment of the present invention will now be described in detail with reference to FIG. 16. In particular, the description focuses mainly on the transmission of information between the control-center control unit 16 of the control center system 10 and the control unit 38 of the dump truck 7. Note that the operations in S1502 to S1504 and S1508 are respectively the same as those in S603 to S605 and S609, and a repetitive description is omitted.

Figure 16:
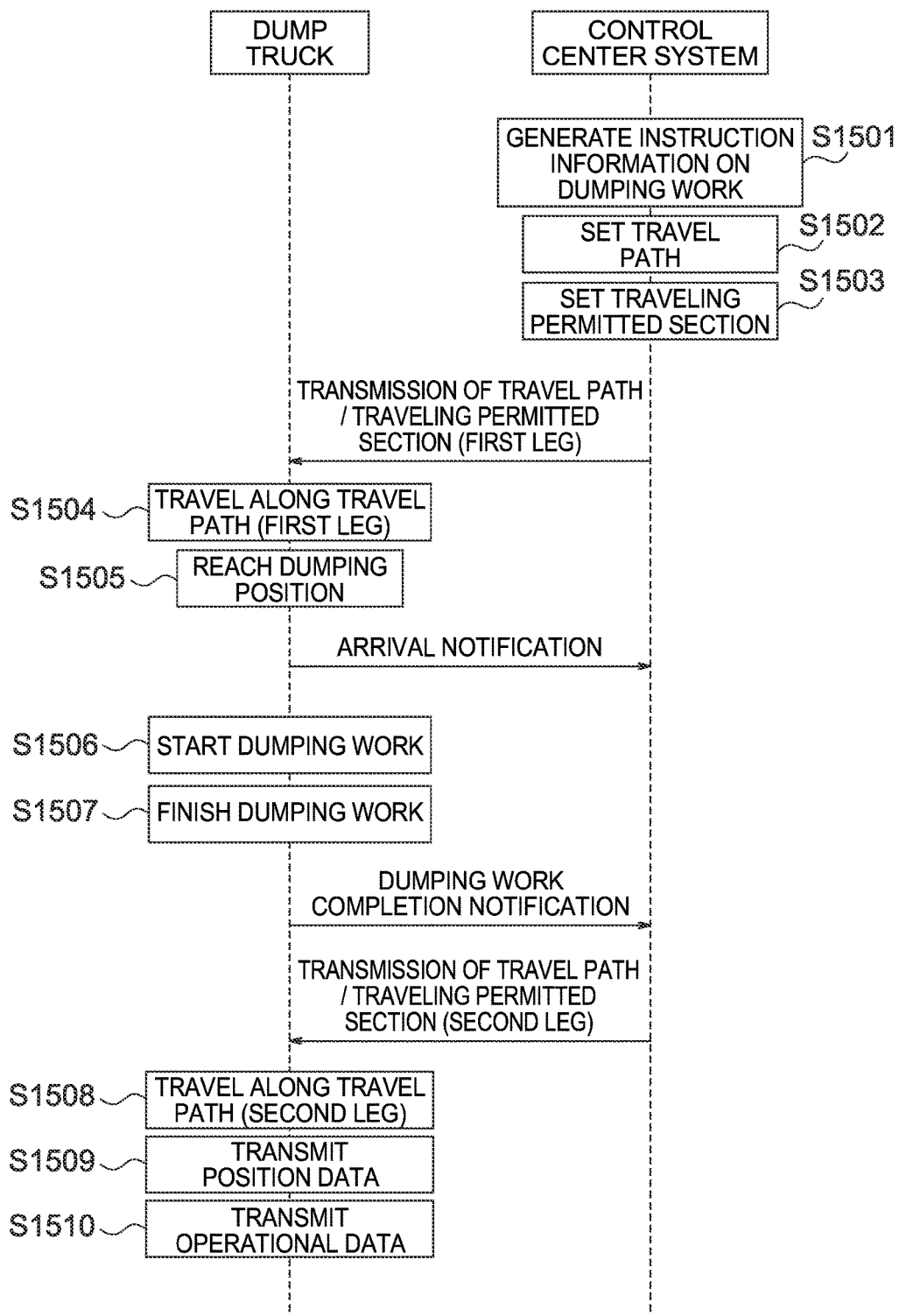
FIG. 16 is a sequence diagram showing the flow of each operation of the control center system and the dump truck in accordance with the third embodiment of the present invention.

As shown in FIG. 16, the control-center control unit 16 of the control center system 10 determines a destination of the dump truck 7 and a kind of the dumping work such as paddock dumping or the like in order to generate an instruction information for the dumping work (S1501). Then, subsequent to the operations in S1502 to S1504, upon the dump truck 7 arriving at the dumping position which is the destination (S1505), the control unit 38 transmits an arrival notification that the dump truck 7 has arrived at the dumping position, to the control center system 10 via the communication unit 35.

Then, the dump truck 7 commences the dumping work in compliance with the instruction information generated in S1501 by the control-center control unit 16 of the control center system 10 (S1506). Then, upon completion of the dumping work of the dump truck 7 (S1507), the control unit 38 transmits a completion notification on the dumping work that the dumping work has been completed, to the control center system 10 via the communication unit 35.

After that, upon reception of the completion notification on the dumping work, the control-center control unit 16 of the control center system 10 transmits the traveling permitted section and the travel path from the dumping position to the next destination to the dump truck 7 via the communication unit 23.

Then, subsequent to the operation in S1508, the control unit 38 of the dump truck 7 transmits the position data 7A of the dump truck 7 accumulated in the work machine information accumulation unit 41 (S1509), so that the position data 7A is accumulated in the work machine information accumulation unit 19 of the control-center system 10. Then, the control unit 38 transmits the operational data 7B of the dump truck 7 accumulated in the work machine information accumulation unit 41 (S1510), so that the operational data 7B is accumulated in the work machine information accumulation unit 19 of the control-center system 10.

Arithmetic processing for an operational range of the dump truck 7 performed by the operational range arithmetic processing unit 21 of the control center system 10 in accordance with the third embodiment of the present invention will now be described in detail with reference to FIG. 17 and FIG. 18. Note that the operations in S1707 and S1708 shown in FIG. 17 are respectively the same as the aforementioned operations in S705 and S706 shown in FIG. 7, and a repetitive description is omitted.

Figure 17:
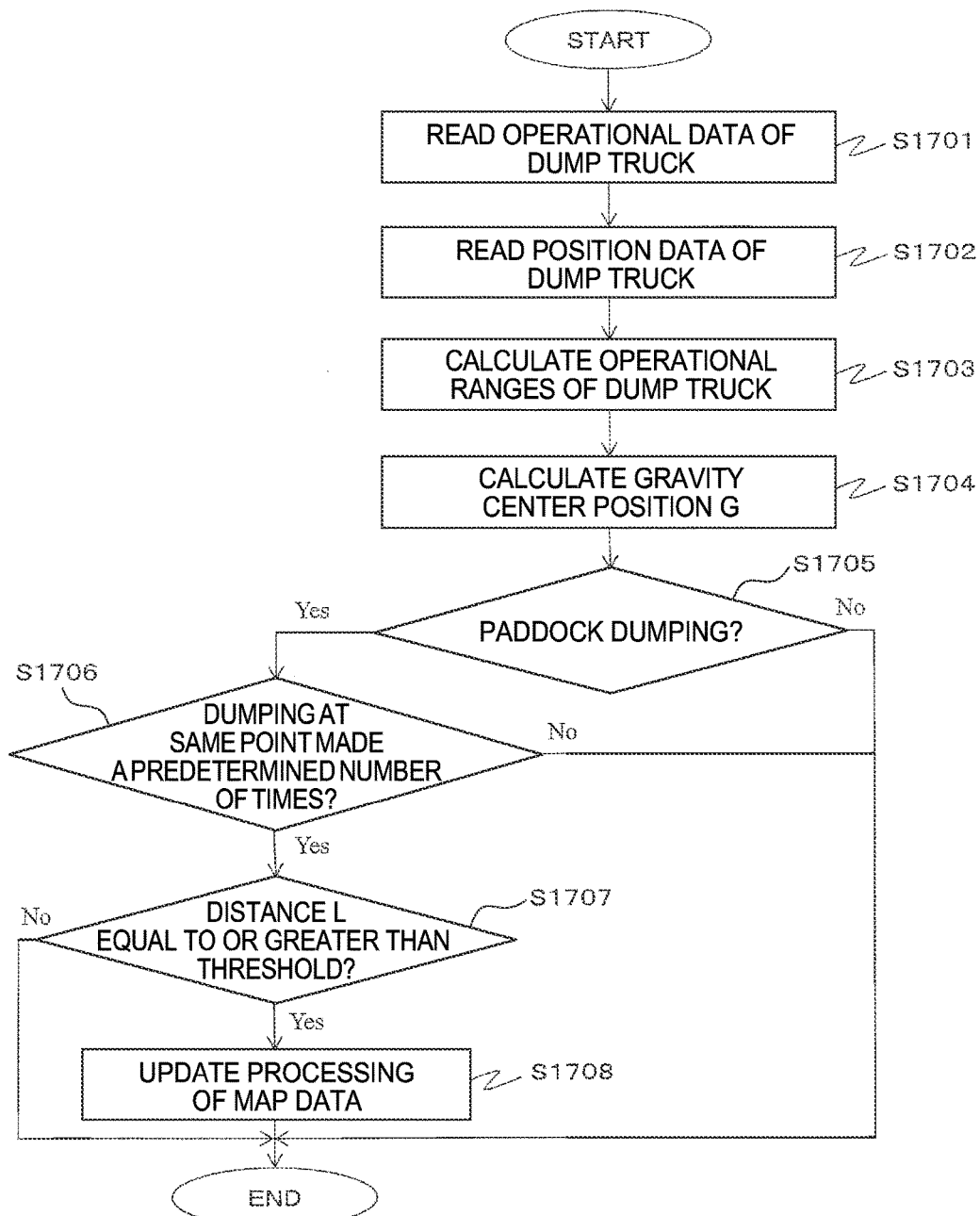
FIG. 17 is a flowchart showing the flow of arithmetic processing for an operational range of the dump truck performed by an operational range arithmetic processing unit in accordance with the third embodiment of the present invention.
Figure 18:
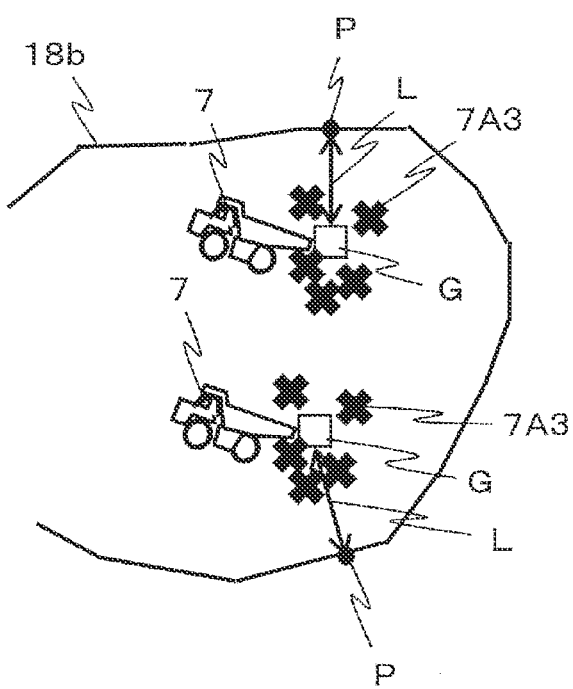
FIG. 18 is a diagram illustrating the process of arithmetic performed for the operational range of the dump truck by the operational range arithmetic processing unit in accordance with the third embodiment of the present invention.

As shown in FIG. 17, the operational range arithmetic unit 21 reads the operational data 7B of the dump truck 7 accumulated in the work machine information accumulation unit 41 (S1701), and reads the position data 7A of the dump truck 7 accumulated in the work machine information accumulation unit 41 (S1702). Then, the operational range arithmetic processing unit 21 uses the acquisition time 7B1, included in the operational data 7B of the dump truck 7 accumulated in the work machine information accumulation unit 41, as a key to search the position data 7A of the dump truck 7 for position coordinates 7A3 falling within a predetermined time period from the acquisition time 7A1 concurrent with the acquisition time 7B1, as shown in FIG. 18, and thereby calculates the operational ranges of the dump truck 7 (S1703).

Next, the operational range arithmetic processing unit 21 performs arithmetic to determine, for example, a gravity center position G at the position coordinates 7A3 retrieved in S1703 as a predetermined reference point of the operational range of the dump truck 7 calculated in S1703 (S1704). Then, the update determination unit 21A of the operational range arithmetic processing unit 21 determines whether or not the kind of dumping work is paddock dumping (S1705). At this time, if the update determination unit 21A determines that the kind of dumping work is not paddock dumping (S1705/No), the arithmetic processing for the operational range of the dump truck 7 by the operational range arithmetic processing unit 21 is terminated.

In contrast, in S1705, if determining that the kind of dumping work is paddock dumping (S1705/Yes), the update determination unit 21A determines whether or not the dump truck 7 has dumped loads at the same point of the dumping site 2 a predetermined number of times (S1706). Note that this determination is made, for example, by counting the number of times the control center system 10 receives the completion notification on the dumping work from the dump tuck 7 at the same location.

If the update determination unit 21A determines in S1706 that the dump truck 7 has not dumped loads at the same point of the dumping site 2 a predetermined number of times (S1706/No), the arithmetic processing for the operational range of the dump truck 7 by the operational range arithmetic processing unit 21 is terminated without the update processing of the map data 18A being performed by the map information update unit 22. If the update determination unit 21A determines in S1706 that the dump truck 7 has dumped loads at the same point of the dumping site 2 a predetermined number of times (S1706/Yes), the processing is performed in S1707 and S1708 before the arithmetic processing for the operational range of the dump truck 7 by the operational range arithmetic processing unit 21 is terminated.

According to the third embodiment of the present invention in this manner of the configuration, in addition to similar advantageous effects to those in the aforementioned first embodiment, the update determination unit 21A of the operational range arithmetic processing unit 21 determines, based on the kind of load dumping work performed by the dump truck 7, whether or not the map information update unit 22 should update the map data 18A, so that a transition to the update processing of the map data 18A can be made following the decision about the kind of load dumping work. As a result, the efficiency of generating the map data 18A in the map generation device 100 can be improved.

Further, in the third embodiment of the present invention, after the update determination unit 21A has determined that the kind of load dumping work is paddock dumping, only when the dump truck 7 dumps the loads at the same point of the dumping site 2 a predetermined number of times, the map information update unit 22 performs the update processing on the map data 18A, thereby permitting accurate verification of the operational range of the dump truck 7 against the map data 18A allowing for changes involved in paddock dumping. As a result, the accuracy of extraction of the boundary 18b of the dumping site 2 in the map data 18A can be improved.

It should be noted that the above embodiments are described in detail for the purpose of facilitating understanding of the present invention, which are not necessarily limited to include all the configurations described above. Further, a part of the configuration of one of embodiments may be substituted by a configuration of any other embodiment or a configuration of any embodiment may be added to the configuration of any other embodiment.

Further, the first embodiment of the present invention has been described with reference with an example, in which, as illustrated in FIG. 9, in S901, the map information update unit 22 sets the circumscribed rectangle F of the position coordinates 6A3 retrieved by the operational range arithmetic processing unit 21 in S703 shown in FIG. 7, and then in S904, adds each endpoint p of the circumscribed rectangle F to temporary map data 18A as a point forming part of the boundary 18a of the loading site 1 in the map data 18A. However, the present invention is not limited to this example. For example, the map information update unit 22 may add polygon data to temporary map data 18A to connect outermost points of the positional coordinates 6A3 by predetermined means as points forming part of the boundary 18a of the loading site 1 in the map data 18A.

Further, the third embodiment of the present invention has been described with reference with an example, in which the data collection unit 39 of the dump truck 7 collects the operational data 7B of the dump truck 7 by recording operation information and/or instruction information provided to the dump truck 7 from the operator waiting in the control center 9 in the machine parking site 3, as operational instruction to be transmitted to the dump truck 7 from the management system 101 of the control center system 10, in order to collect the operational data 7B of the dump truck 7. However, the present invention is not limited to this example.

For example, the data collection unit 20 of the control center system 10 may have the function as an operational information collection unit that collects the operational data 7B of the dump truck 7 by recording the operating information and/or the instruction information provided to the dump truck 7 by the operator waiting in the control center 9 in the machine parking site 3, and then the operational data 7B thus collected may be accumulated in the work machine information accumulation unit 19. This provides efficient accumulation of the operational data 7B of the dump truck 7 into the work machine information accumulation unit 19.

LIST OF REFERENCE SIGNS

1 . . . Loading site (working site)
1A . . . Boundary
2 . . . Dumping site (working site)
2A . . . Boundary
3 . . . Machine parking site
3A . . . Boundary
6 . . . Hydraulic excavator (work machine, loading machine)
6A, 7A . . . Position data (position information)
6A1 . . . Acquisition time
6A2 . . . Work machine ID
6A3, 7A3 . . . Position coordinates
6B, 7B . . . Operational data (operational information)
6B1, 7B1 . . . Acquisition time
6B2, 7B2 . . . Work machine ID
6B3, 7B3 . . . Operational status
7 . . . Dump truck (work machine, haulage vehicle)
9 . . . Control center
10 . . . Control center system
11 . . . work vehicle
16 . . . Control-center control unit
17 . . . Map information generation unit
18 . . . Map information storage unit
18A . . . Map data (travelable map information)
18a, 18b, 18c . . . Boundary
19 . . . Work machine information accumulation unit
20 . . . Data collection unit (operational information collection unit)
21 . . . Operational range arithmetic processing unit (operational range arithmetic unit)
21A . . . Update determination unit
22 . . . Map information update unit
22A . . . Boundary correction unit
26 . . . Positioning unit
27 . . . Sensor unit 28 ... Control unit
29 ... Data collection unit
30 ... Work machine information accumulation unit
36 ... Positioning unit
37 ... Sensor unit
38 ... Control unit
39 ... Data collection unit
40 ... Map information storage unit
41 ... Work machine information accumulation unit
100 ... Map generation device
101 ... Management system

The invention claimed is:

1. A map generation device which generates travelable map information representing an area capable of being traveled by work machines, including a haulage vehicle hauling a load, the travelable map information being defined as inside an area of a boundary of a working site,
the map generation device being configured by connecting a controller including a CPU;
a storage device; and
a communication device,
wherein the storage device stores programs that when executed by the CPU configure the CPU to:
store the travelable map information in the storage device and input/output the travelable map information to/from the storage device,
receive and transmit, with the communication device, position information obtained by positioning devices equipped on the work machines between the controller and the work machines,
wirelessly communicate the travelable map information stored in the storage device with the work machines including the haulage vehicle and a loading machine loading a load onto the haulage vehicle with the communication device;
accumulate position information representing a position of one of the work machines and operational information representing an operational status of the one work machine as the one work machine travels in the working site;
calculate an operational range of the one work machine on the basis of the position information and the operational information;
calculate a gravity center position as a reference point of the operational range of the one work machine on the basis of the position information;
and
verify the operational range of the one work machine against the travelable map information by determining that the one work machine is within the boundary of the working site when a distance between the gravity center position and a position closest to the gravity center position on the boundary of the working site is greater than a predetermined threshold;
correct boundary information of the working site in the travelable map information to decrease an area of the working site when the gravity center position is determined in the verifying of the operational range of the one work machine to be located within the boundary of the working site;
correct the boundary information of the working site in the travelable map information to increase the area of the working site when the gravity center position is determined in the verifying of the operational range of the one work machine to be either located on the boundary or outside the boundary of the working site;
and then update the travelable map information with the corrected boundary information.

2. The map generation device according to claim 1, wherein the programs stored in the storage device when executed by the CPU further configure the CPU to
calculate an operational range of the loading machine as the one work machine from a predetermined operational status of the loading machine in the operational information, and a position of the loading machine associated with the predetermined operational status in the position information.

3. The map generation device according to claim 2, wherein
the programs stored in the storage device when executed by the CPU further configure the CPU to calculate the operational range of the haulage vehicle as the one machine from a position of the haulage vehicle associated with the predetermined operational status in the position information, and
to verify the operational ranges of the loading machine and the haulage vehicle against the travelable map information in order to correct the boundary of the working site in the travelable map information and then update the travelable map information.

4. The map generation device according to claim 1, wherein programs stored in the storage device when executed by the CPU further configure the CPU to
determine whether or not to update the travelable map information based on a kind of dumping work of dumping the load by the haulage vehicle.

5. The map generation device according to claim 4, wherein
programs stored in the storage device when executed by the CPU further configure the CPU to, in paddock dumping in which the load is dumped while the haulage vehicle changes from one dumping position to another, and
when the haulage vehicle dumps the load at a same point of the working site a predetermined number of times, determine to update the travelable map information, and
when the haulage vehicle does not dump the load at the same point of the working site the predetermined number of times, determine not to update the travelable map information.

6. The map generation device according to claim 1, wherein the programs stored in the storage device when executed by the CPU further configure the CPU to
connect to a management system that transmits an operational instruction for operating the work machines and manages the operational status of the work machines;
collect contents of the operational instruction transmitted from the management system to the work machines, and accumulate the contents of the operational instruction thus collected in the work machines.

7. The map generation device according to claim 1, wherein programs stored in the storage device when executed by the CPU further configure the CPU to, when the gravity center position of the loading machine is located on the boundary or outside the boundary of the working site in the travelable map information, transmit a confirmation instruction for confirming the boundary of the working site to the work machine before the boundary information of the working site in the travelable map information is corrected to increase the area of the working site.

* * * * *